United States Patent
Lee et al.

(10) Patent No.: US 12,343,794 B2
(45) Date of Patent: Jul. 1, 2025

(54) METHOD FOR MANUFACTURING CHIRAL NANOSTRUCTURE AND APPARATUS FOR FORMING HELICAL MAGNETIC FIELD TO MANUFACTURE CHIRAL NANOSTRUCTURE

(71) Applicant: The Industry & Academic Cooperation in Chungnam National University (IAC), Daejeon (KR)

(72) Inventors: Jae Beom Lee, Hwaseong-si (KR); Ki Jae Jeong, Busan (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 462 days.

(21) Appl. No.: 17/775,861

(22) PCT Filed: Nov. 4, 2020

(86) PCT No.: PCT/KR2020/015353
§ 371 (c)(1),
(2) Date: May 10, 2022

(87) PCT Pub. No.: WO2021/096153
PCT Pub. Date: May 20, 2021

(65) Prior Publication Data
US 2022/0395901 A1    Dec. 15, 2022

(30) Foreign Application Priority Data
Nov. 12, 2019   (KR) .......................... 10-2019-0144027

(51) Int. Cl.
*B22F 9/24* (2006.01)
*B22F 1/00* (2022.01)
(Continued)

(52) U.S. Cl.
CPC .................. *B22F 1/00* (2013.01); *B22F 1/07* (2022.01); *B22F 9/24* (2013.01); *B22F 2202/05* (2013.01);
(Continued)

(58) Field of Classification Search
None
See application file for complete search history.

(56) References Cited

U.S. PATENT DOCUMENTS

| | | | |
|---|---|---|---|
| 6,099,706 A * | 8/2000 | Hirabayashi | ........ H01J 37/3426 118/728 |
| 2012/0171438 A1* | 7/2012 | Roberts, III | ............. C08J 5/005 977/734 |

(Continued)

FOREIGN PATENT DOCUMENTS

| KR | 20040035323 A | 4/2004 |
|---|---|---|
| KR | 20050016429 A | 2/2005 |

(Continued)

OTHER PUBLICATIONS

International serach report of PCT/KR2020/015353, Jan. 29, 2021, English translation.

*Primary Examiner* — George Wyszomierski
(74) *Attorney, Agent, or Firm* — STIP Law Group, LLC

(57) ABSTRACT

A method of manufacturing a chiral nano-structure having chirality using a magnetic field according to one embodiment of the present disclosure includes a magnetic field forming operation that forms a magnetic field; a particle arranging operation that arranges at least two nanoparticles in the magnetic field; and a magnetic field adjusting operation that adjusts at least one of a magnetic flux density, a magnetization direction, and a spatial range of the magnetic field, in which in the magnetic field adjusting operation, the arrangement of the nanoparticles arranged in the magnetic (Continued)

field is aligned to correspond to a structure of the magnetic field, and the entire structure is formed as a nano-structure having chirality.

12 Claims, 17 Drawing Sheets

(51) Int. Cl.
*B22F 1/07* (2022.01)
*B82B 1/00* (2006.01)
*B82B 3/00* (2006.01)
*B82Y 40/00* (2011.01)
(52) U.S. Cl.
CPC ............ *B82B 1/007* (2013.01); *B82B 3/0061* (2013.01); *B82Y 40/00* (2013.01)

(56) References Cited

U.S. PATENT DOCUMENTS

| | | | | |
|---|---|---|---|---|
| 2012/0189964 A1* | 7/2012 | Heyderman | ........... | B82Y 10/00 |
| | | | | 430/401 |
| 2013/0105581 A1* | 5/2013 | Kwon | ................. | G06K 19/022 |
| | | | | 235/493 |
| 2017/0304796 A1* | 10/2017 | Duan | ..................... | H01F 1/0054 |
| 2018/0244518 A1* | 8/2018 | Miraglia | .............. | C12Q 1/6806 |

FOREIGN PATENT DOCUMENTS

| | | | |
|---|---|---|---|
| KR | 101581406 B1 | 12/2015 | |
| KR | 20190117370 A | 10/2019 | |
| WO | WO-2004/088695 A1 * | 10/2004 | |

* cited by examiner

[FIG. 1]
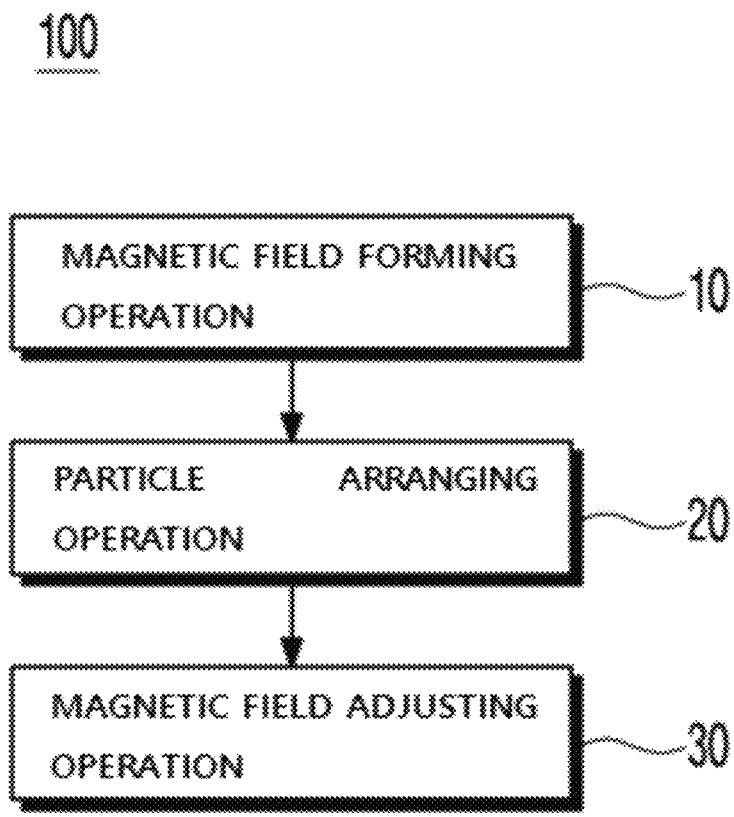

[FIG. 2]
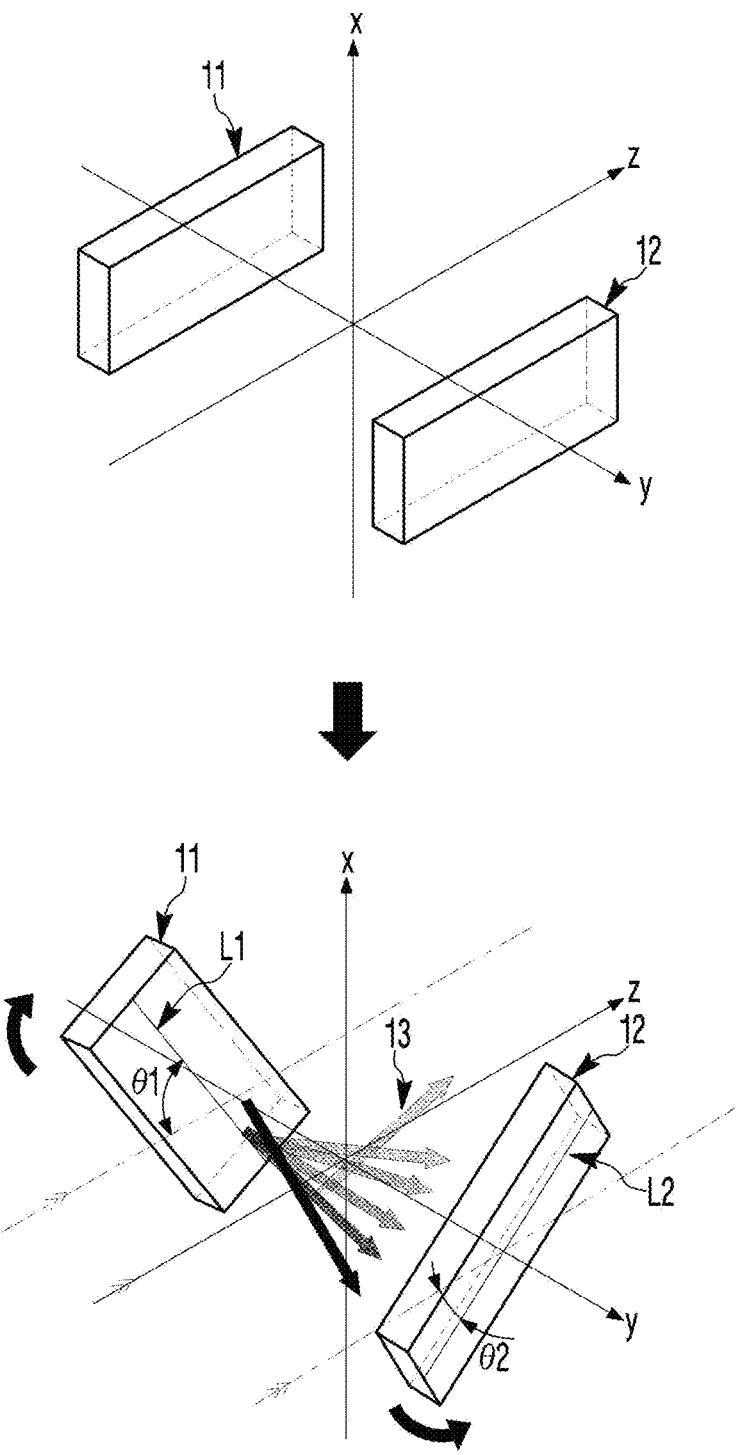

[FIG. 3]
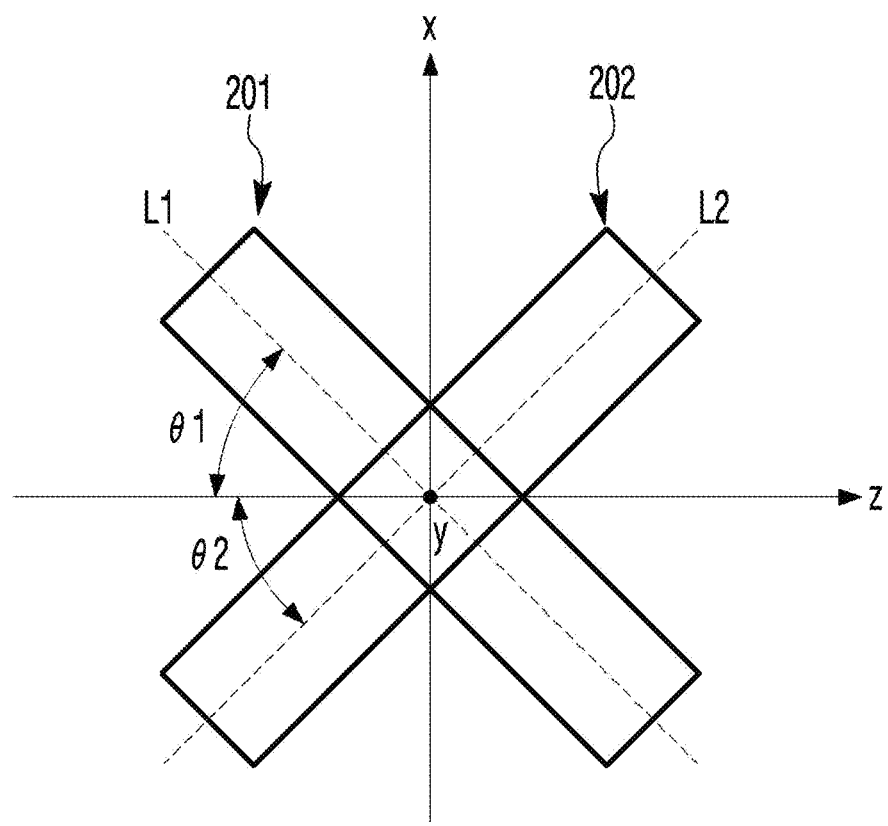

[FIG. 4]
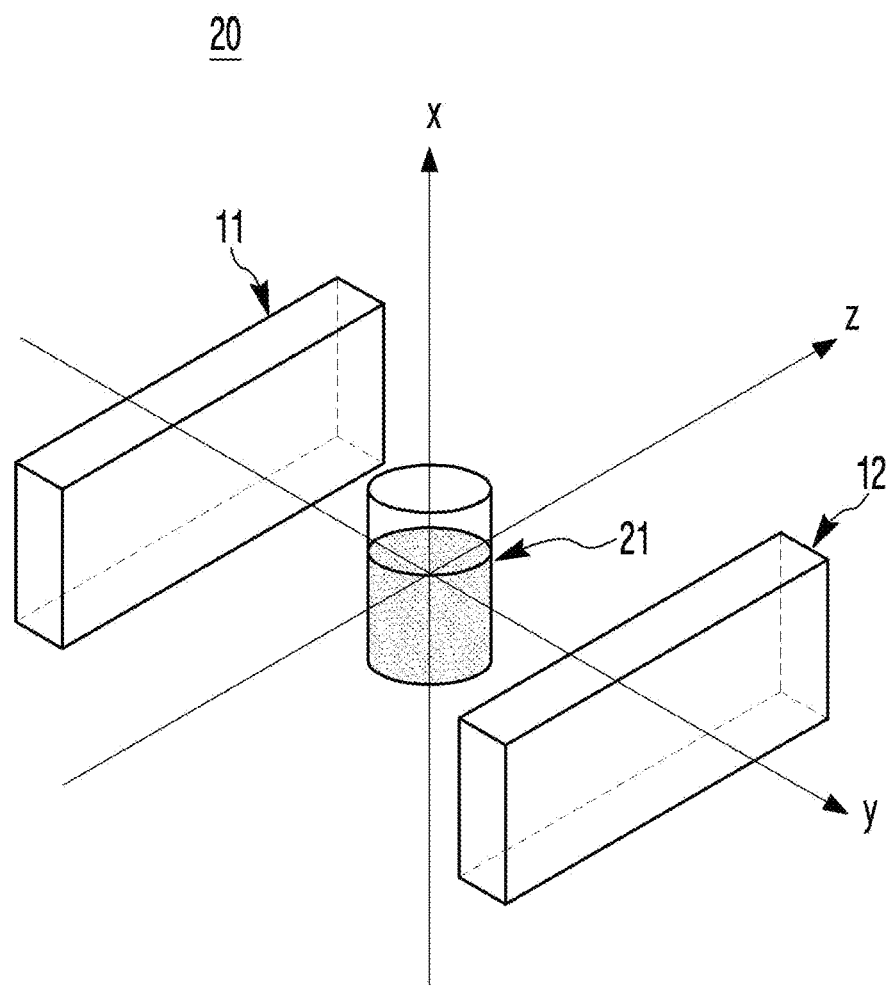

[FIG. 5(a)]
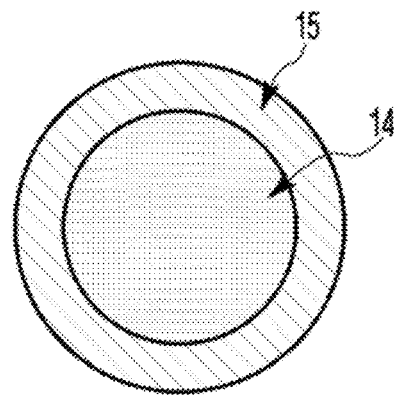
(a)
[FIG. 5(b)]
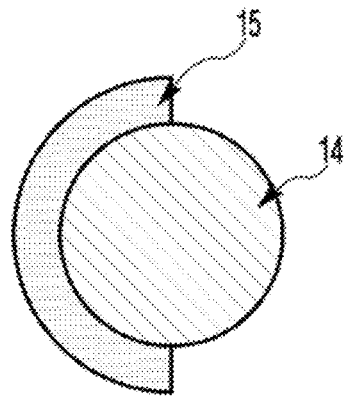
(b)
[FIG. 5(c)]
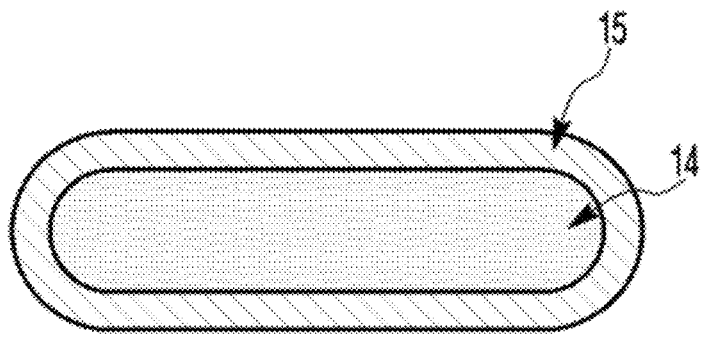
(c)

[FIG. 6]
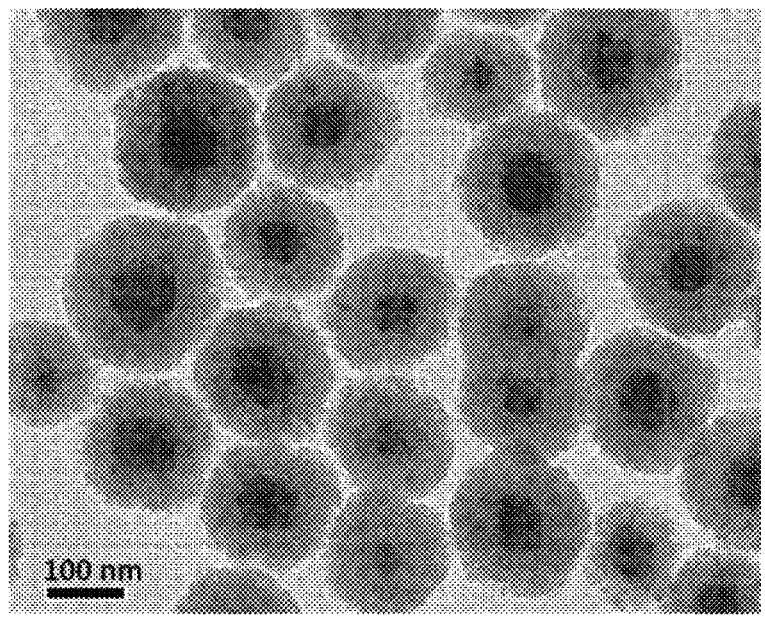
[FIG. 7]
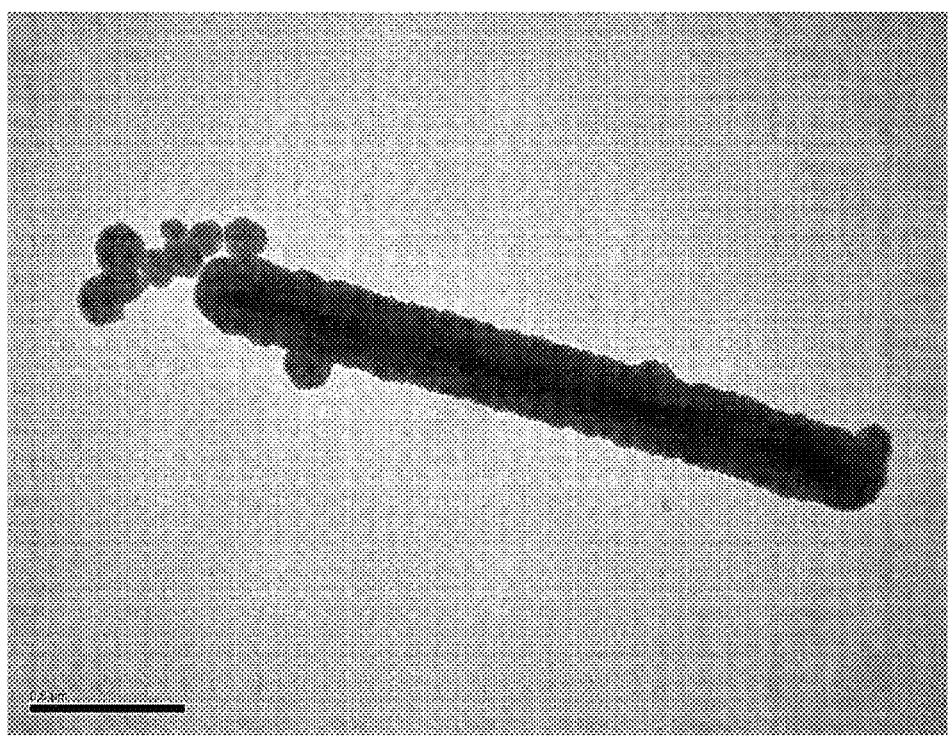

[FIG. 8]
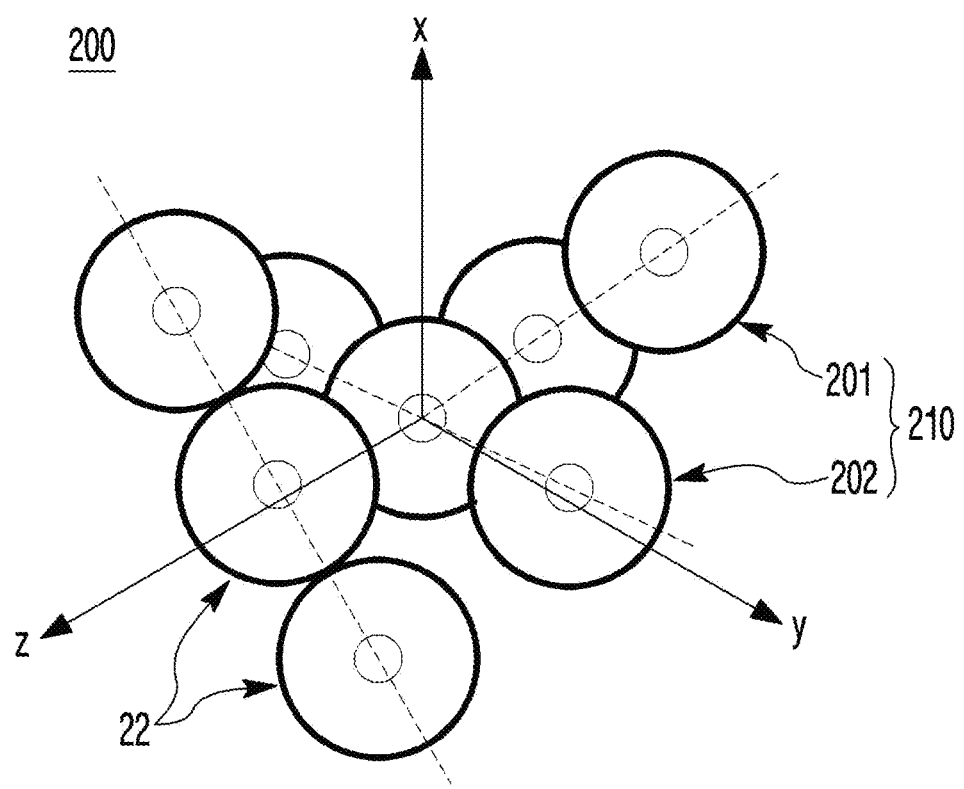

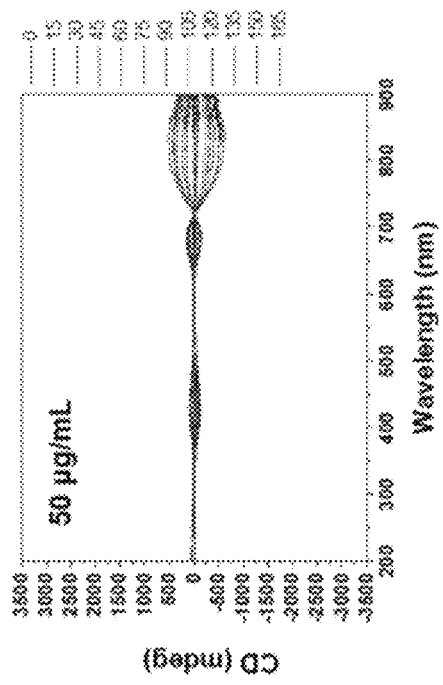
[FIG. 9(b)]
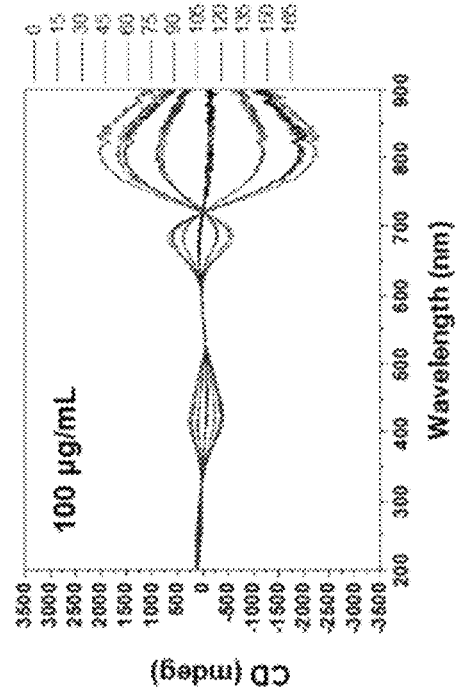
[FIG. 9(d)]
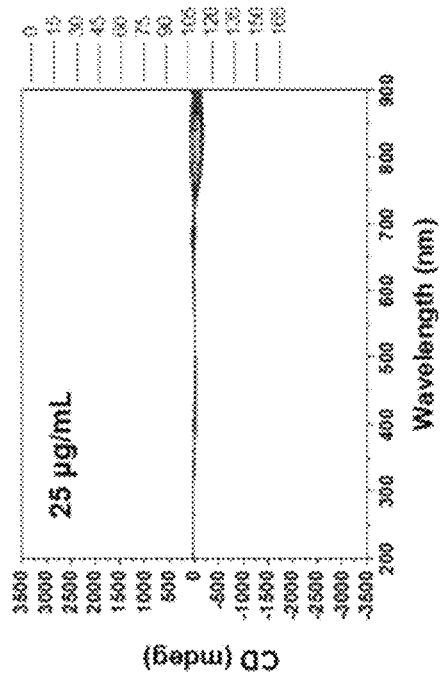
[FIG. 9(a)]
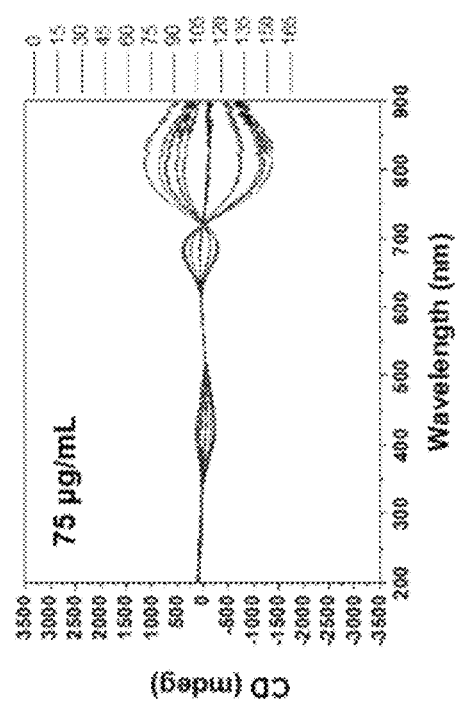
[FIG. 9(c)]

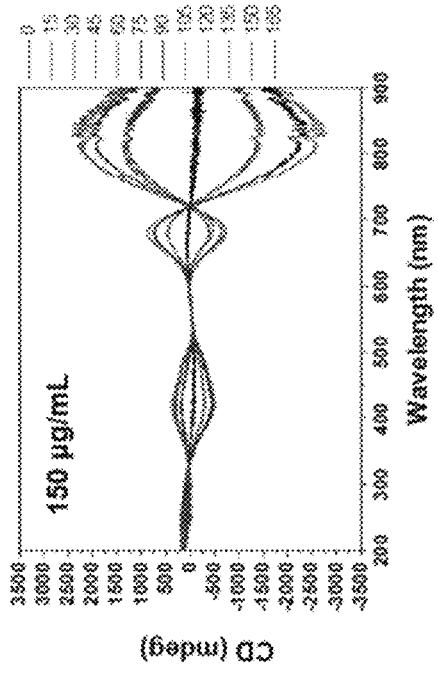
[FIG. 9 (e)] 125 μg/mL
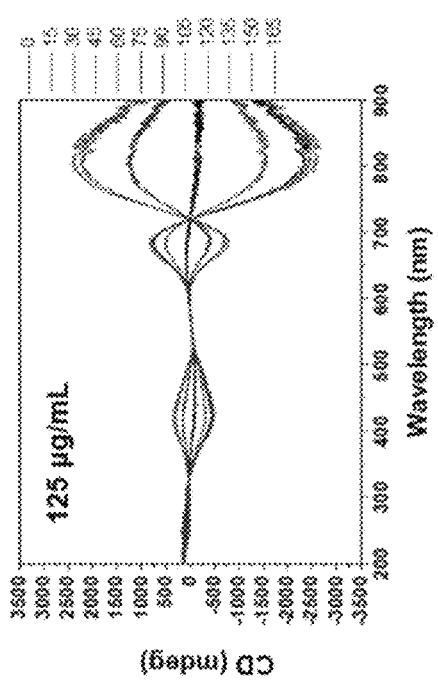
[FIG. 9 (f)] 150 μg/mL
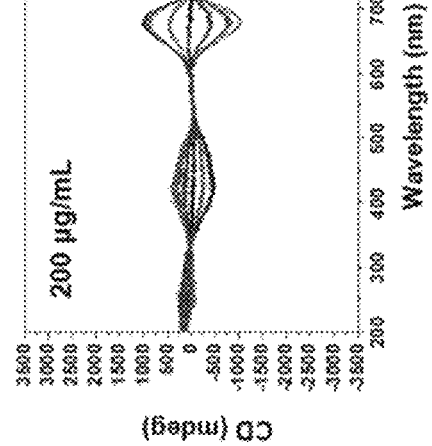
[FIG. 9 (g)] 175 μg/mL
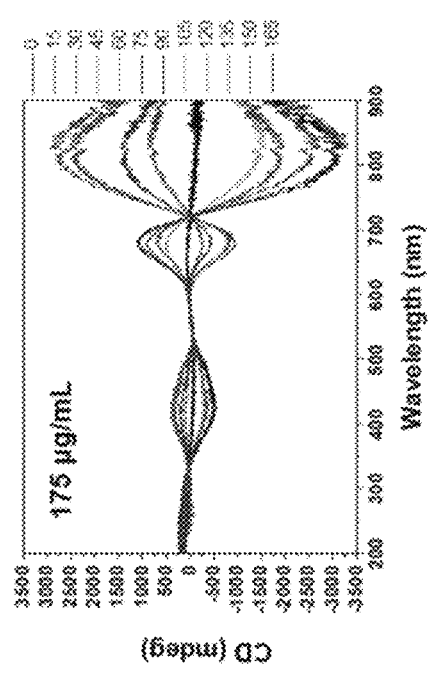
[FIG. 9 (h)] 200 μg/mL

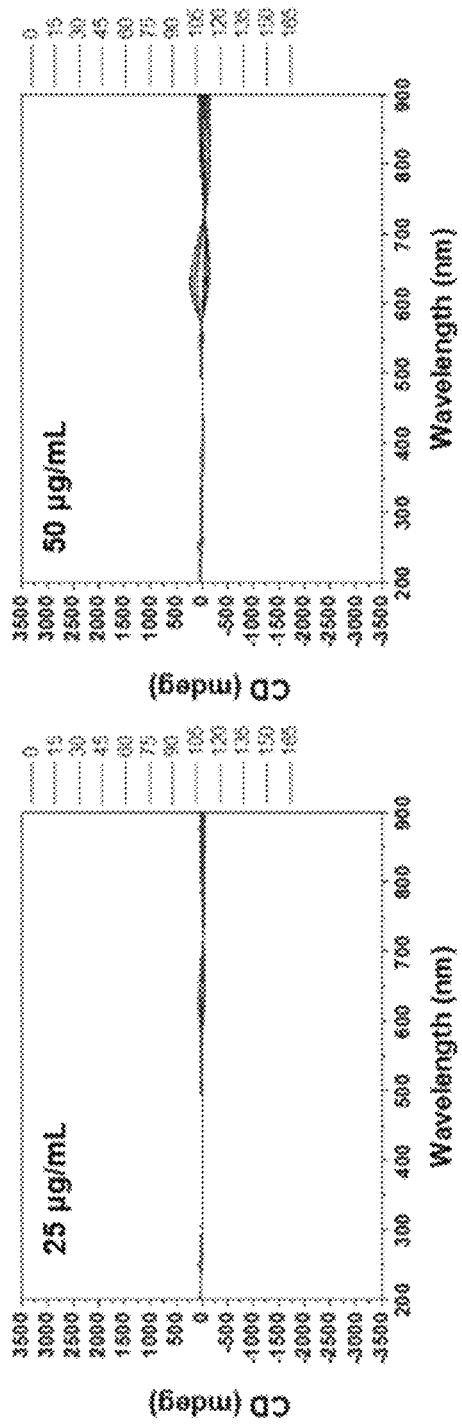
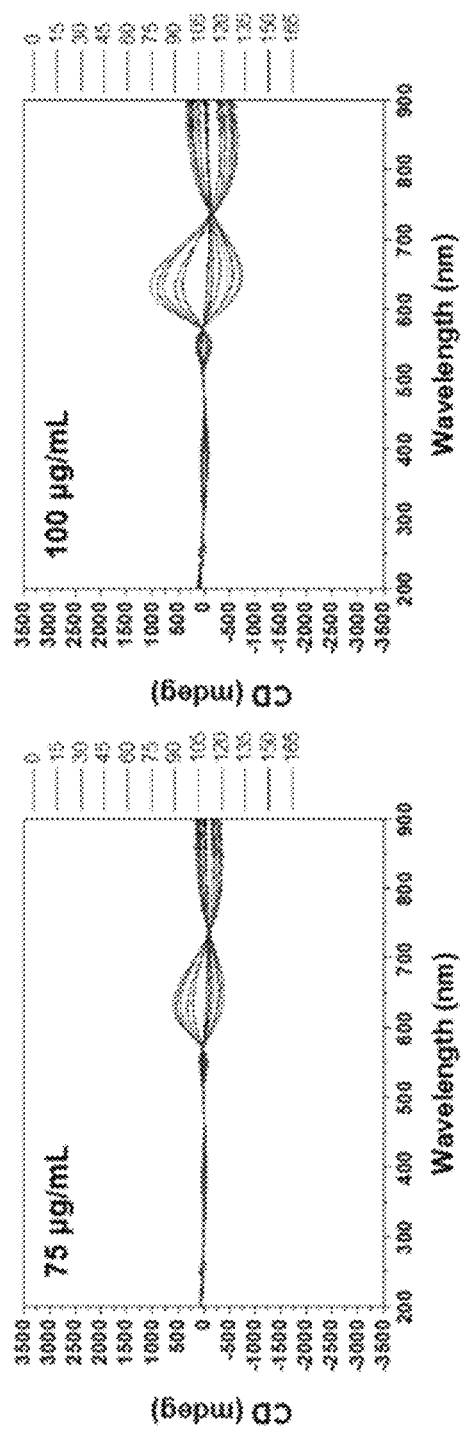
[FIG. 10 (a)] 25 μg/mL
[FIG. 10 (b)] 50 μg/mL
[FIG. 10 (c)] 75 μg/mL
[FIG. 10 (d)] 100 μg/mL

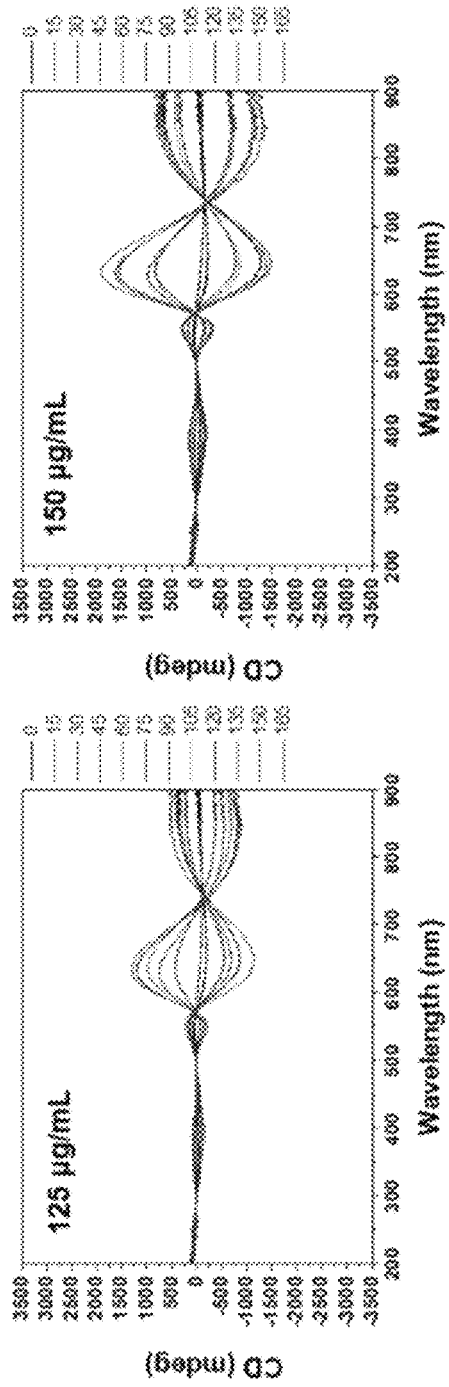
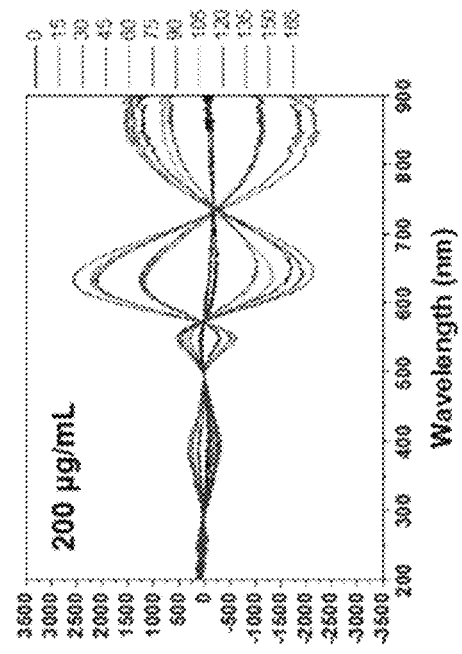
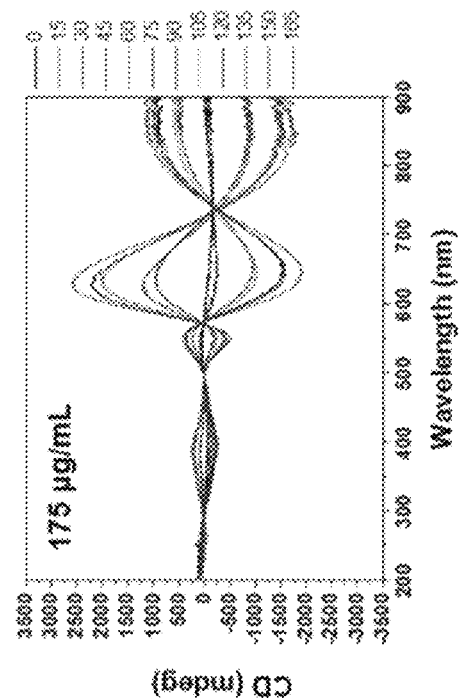

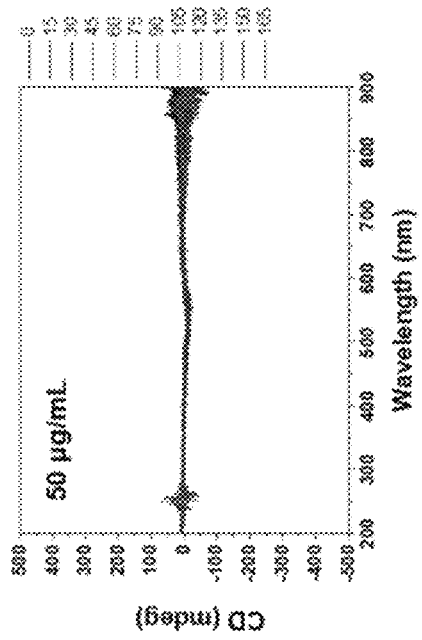
[FIG. 11 (b)]
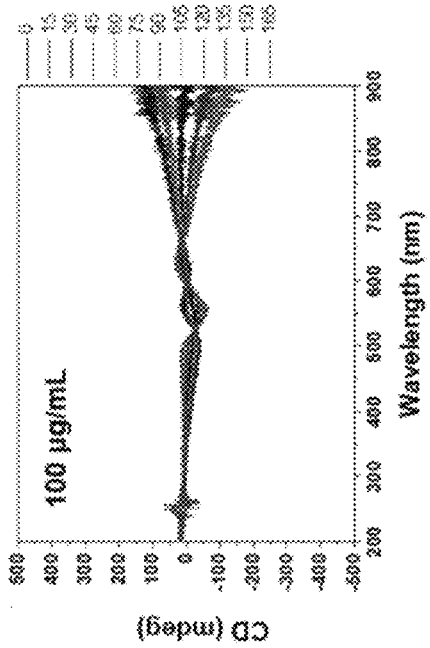
[FIG. 11 (d)]
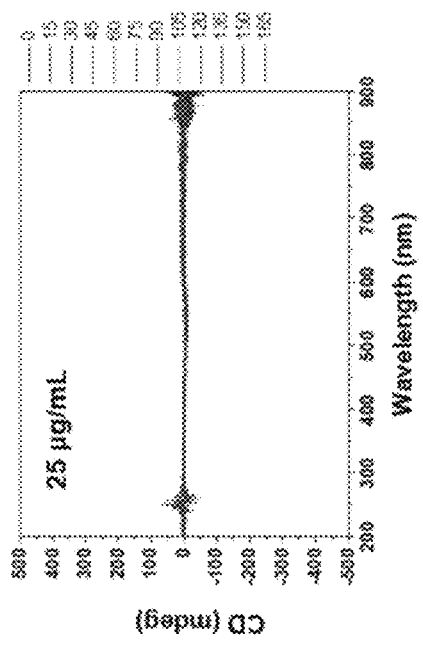
[FIG. 11 (a)]
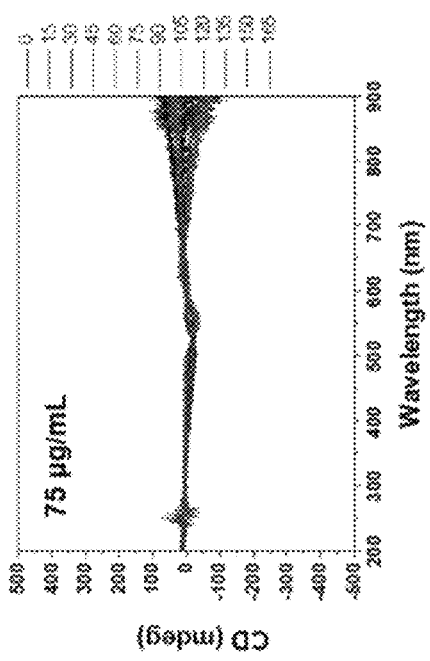
[FIG. 11 (c)]

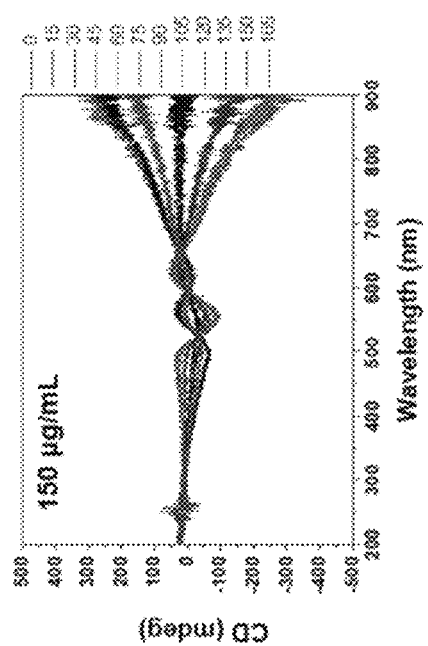
[FIG. 11 (e)]
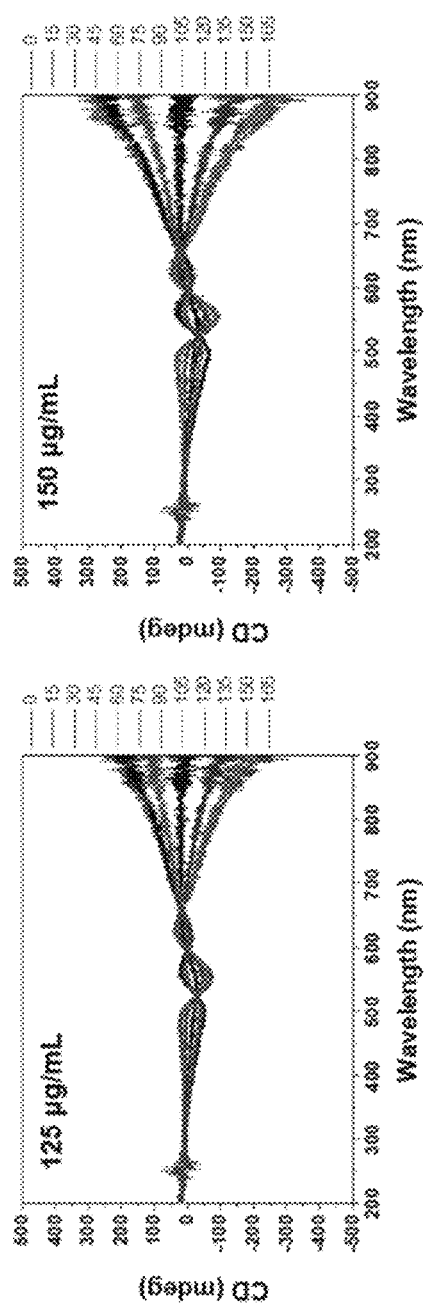
[FIG. 11 (f)]
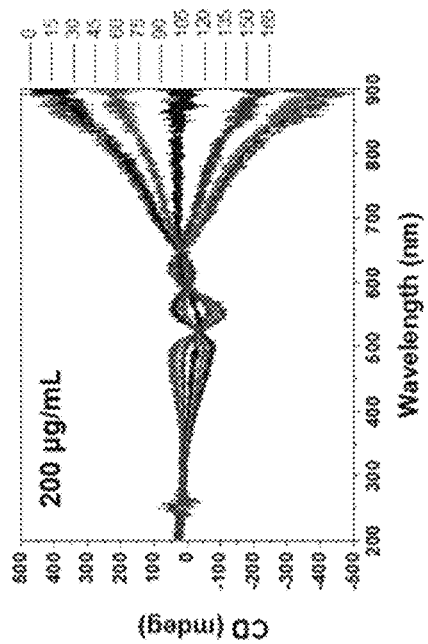
[FIG. 11 (g)]
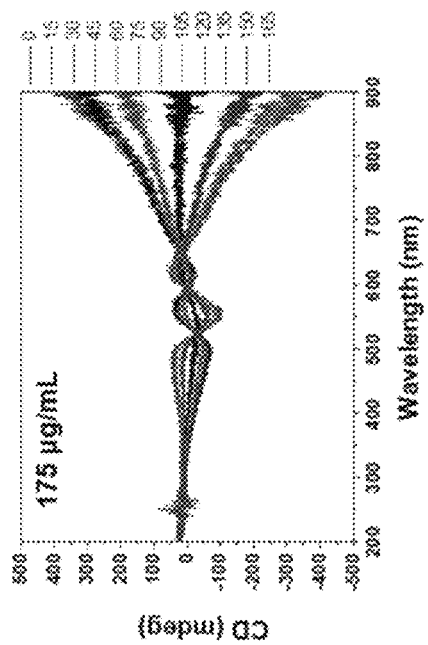
[FIG. 11 (h)]

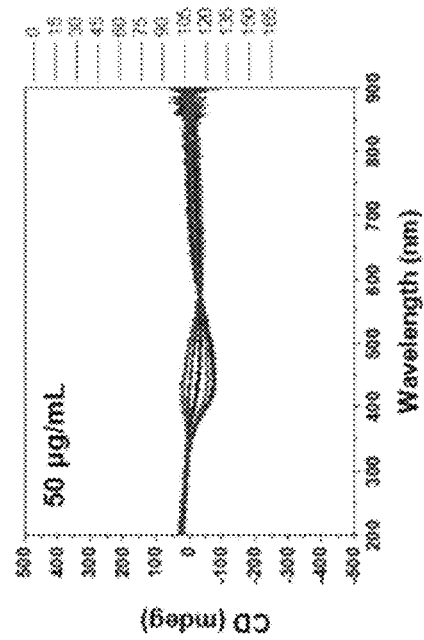
[FIG. 12 (b)]
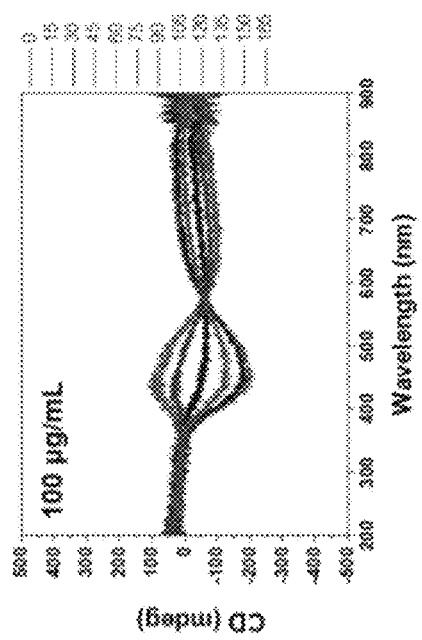
[FIG. 12 (d)]
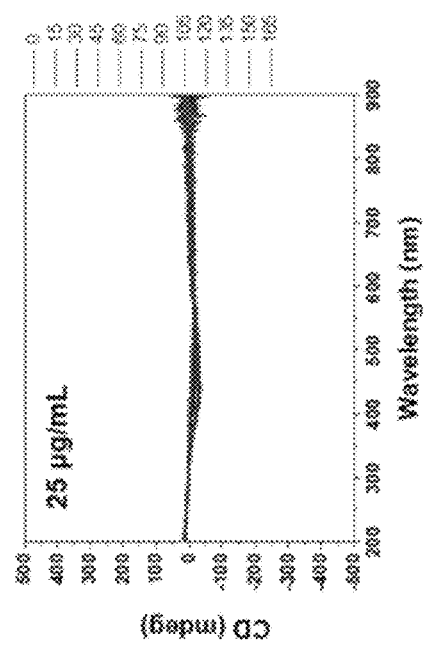
[FIG. 12 (a)]
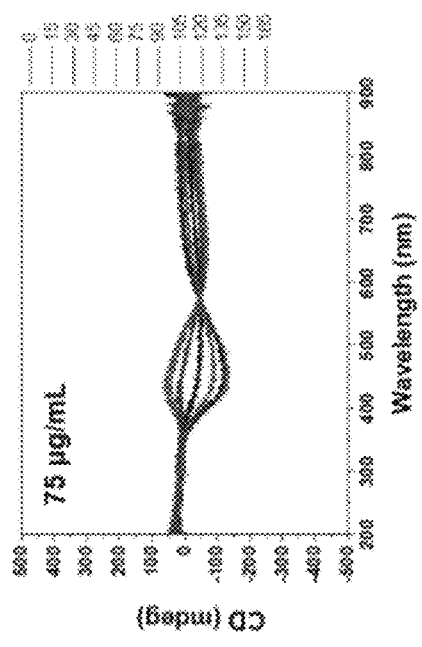
[FIG. 12 (c)]

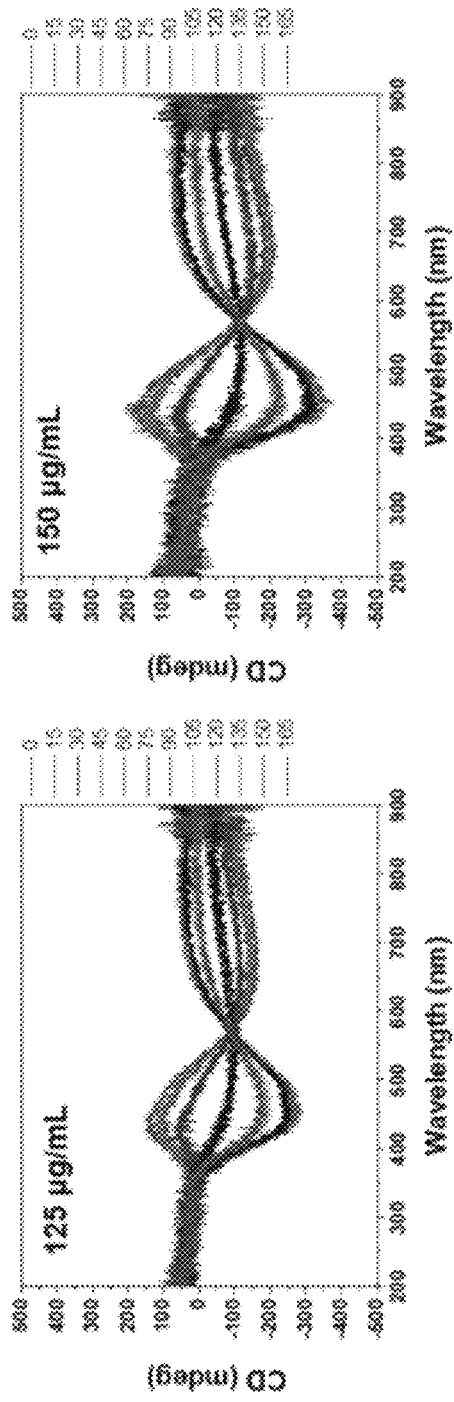
[FIG. 12 (e)] 125 μg/mL
[FIG. 12 (f)] 150 μg/mL
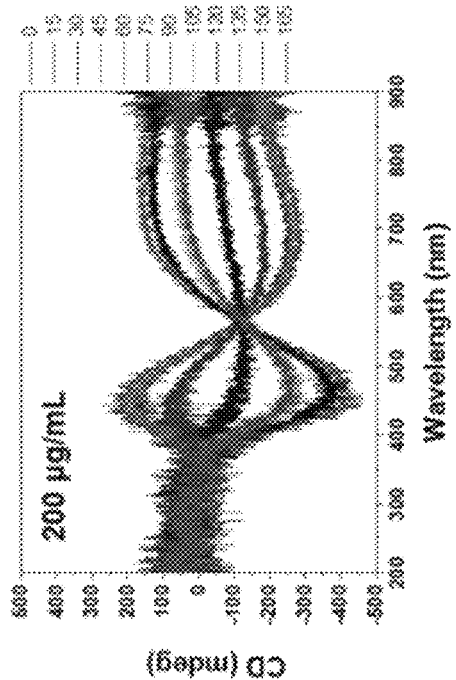
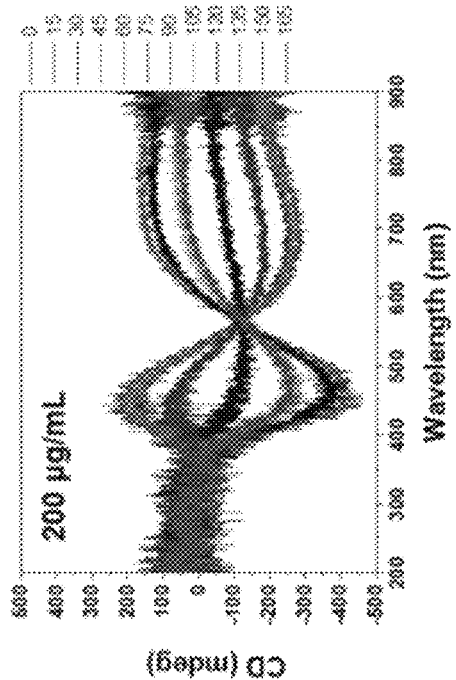
[FIG. 12 (g)] 175 μg/mL
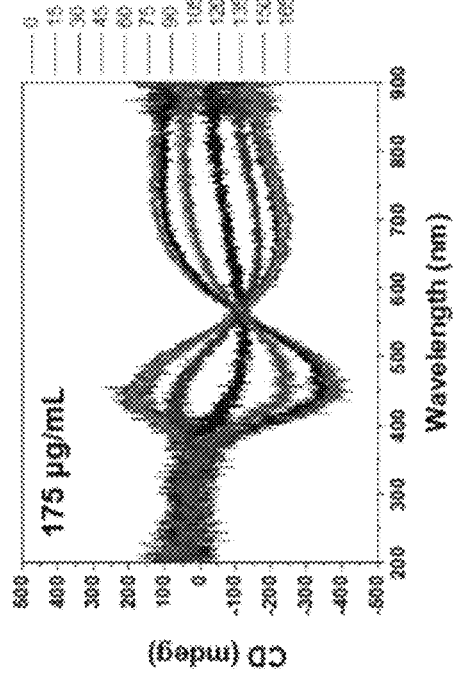
[FIG. 12 (h)] 200 μg/mL

[FIG. 13(a)]
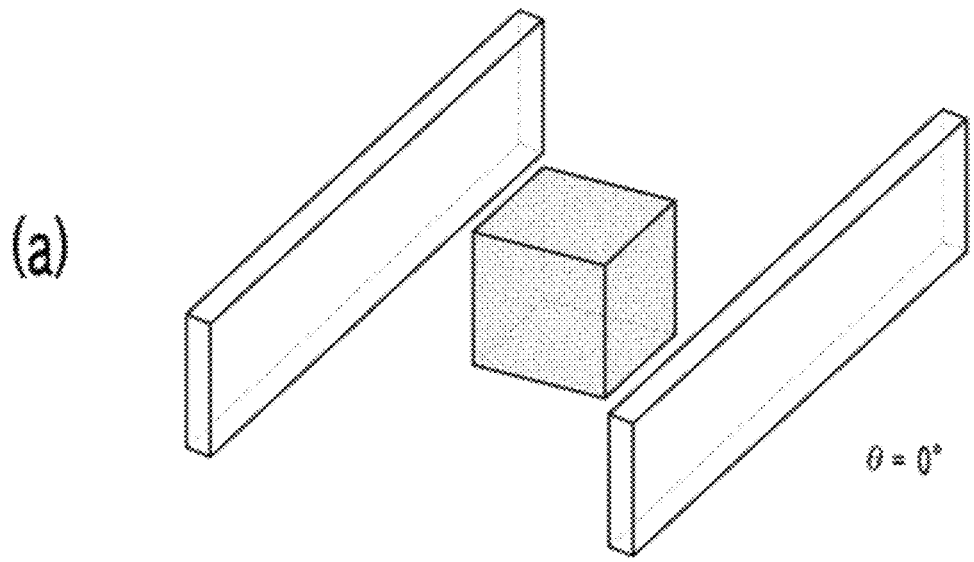
[FIG. 13(b)]
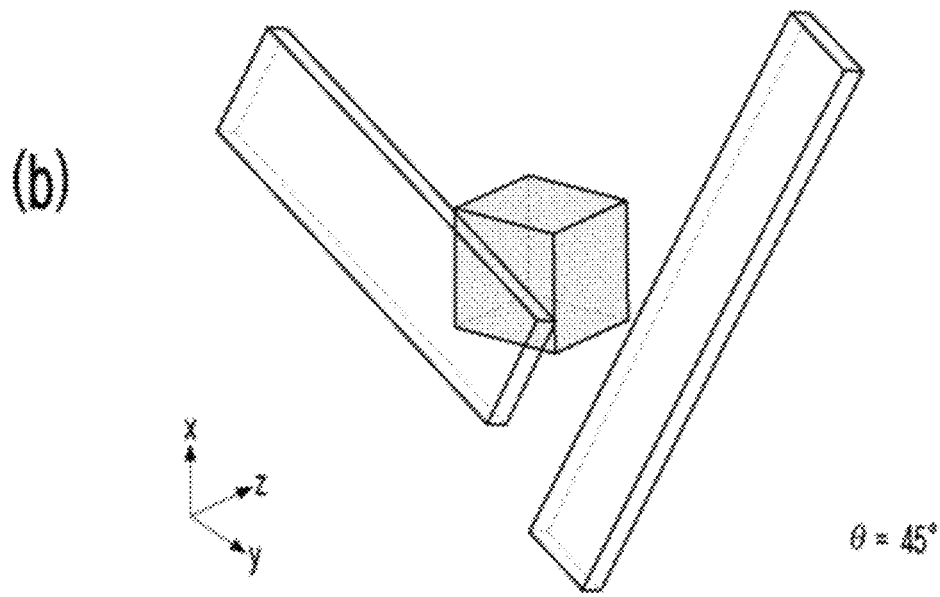

[FIG. 14(a)]
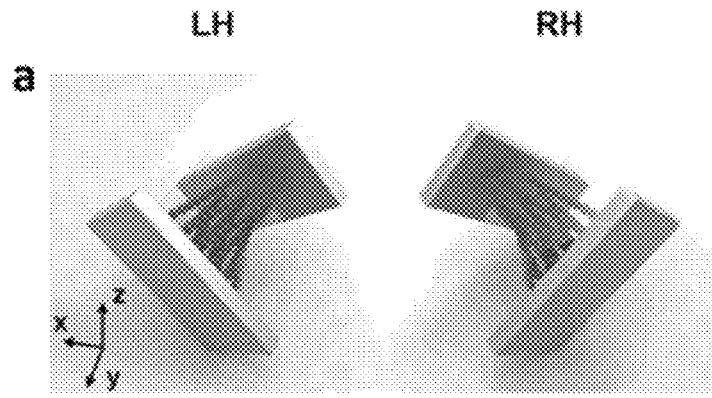
[FIG. 14(b)]
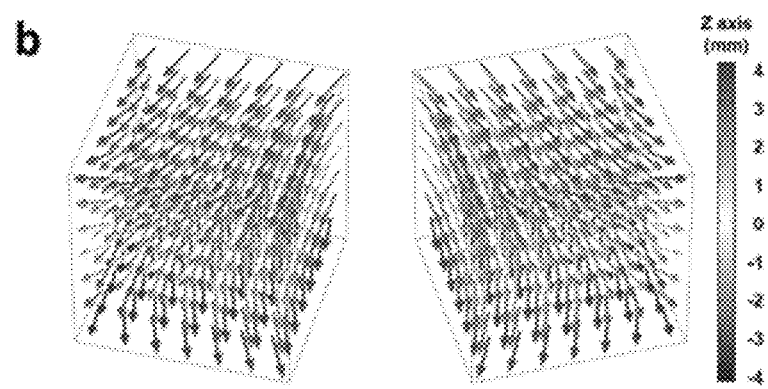
[FIG. 14(c)]
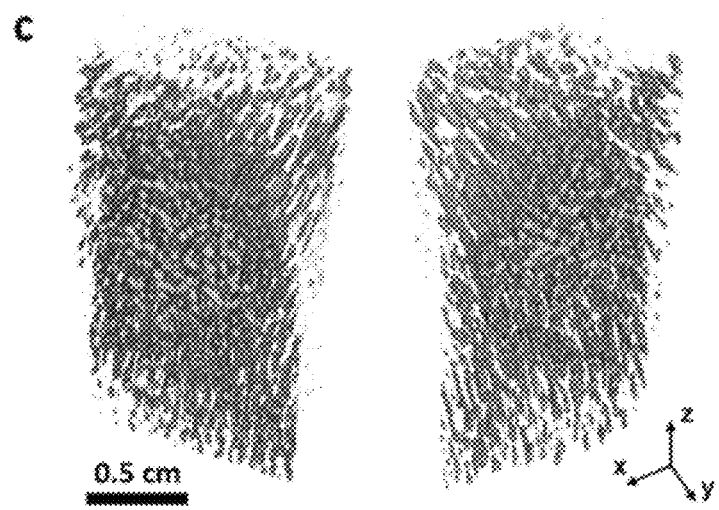

METHOD FOR MANUFACTURING CHIRAL NANOSTRUCTURE AND APPARATUS FOR FORMING HELICAL MAGNETIC FIELD TO MANUFACTURE CHIRAL NANOSTRUCTURE

CROSS-REFERENCE TO RELATED APPLICATIONS

This application is the U.S. National Phase under 35 U.S.C. § 371 of International Application No. PCT/KR2020/015353 filed on Nov. 4, 2020, which in turn claims the benefit of Korean Application No. 10-2019-0144027 filed on Nov. 12, 2019, the disclosures of which are incorporated by reference into the present application.

TECHNICAL FIELD

The present disclosure relates to a method of manufacturing a chiral nano-structure and an apparatus for forming a spiral magnetic field for manufacturing the same, and more specifically, the present disclosure is to provide a method capable of effectively manufacturing a chiral nano-structure using a magnetic field through a simpler process than the conventional process.

BACKGROUND ART

With the continuous development of synthesis technology, it is possible to manufacture nano-sized particles using a metal, and it has been found that these nanoparticles have various and unique properties due to the advancement of analysis technology. For example, it was found that the nano-sized metallic particles have the optical properties of the three-dimensional structures made of the nano-sized metallic particles that vary depending on the geometric structure, which is caused by the localized surface plasmon resonance (LSPR) phenomenon. These nanoparticles are themselves or a three-dimensional structure consisting of the same according to their compositions, structures, etc., and can be used in various technical fields such as optics, biotechnology, and catalysts. In addition, as the field of nano-science has recently been spotlighted as a new next-generation industrial field, the demand for nanoparticles of various compositions and structures is increasing. Research on synthesizing the three-dimensional structure using nanoparticles of specific compositions and structures is being actively conducted in line with this technological trend, and a chemical synthesis method is being mainly used. For example, recently, a method of synthesizing the three-dimensional structure using a peptide to which two or more amino acids are bound has been proposed. In addition, a method using the e-beam lithography, a hole lithography method using nano-sized holes to perform rotational deposition, etc. are being studied.

Meanwhile, all substances that exist in nature have chirality. For example, amino acids mostly consist of L-amino acids, and for saccharides, D-sugars are the mainstream. As described above, since living organisms always have homochirality, fatal damage to the organism appears when the living organism react with a material filtering the same. The chiral structure prepared from nanoparticles by applying this chirality refers to a three-dimensional structure having an asymmetric structure that does not have any mirror image symmetry. The degeneracy of right and left polarized lights is broken because electric dipoles and magnetic dipoles generated by incident electromagnetic waves interact in the same direction in the chiral structure. Accordingly, the chiral structure has different refractive indices with respect to the left and right polarized lights, and thus, when the linearly polarized light is incident on the chiral material, the photoactive property in which the polarization state is rotated appears. The chiral structure can be variously used in the fields of optical materials and catalysts using this photoactive property.

As described above, the three-dimensional chiral structure composed of a geometrically aligned structure of nanoparticles is prepared by the chemical synthesis method in many cases. However, the conventional nanoparticles and the synthesis of the structure using the same have the complicated process and insufficient precision and accuracy. Accordingly, the present inventors have studied a method capable of elaborately producing a chiral nano-structure in a simpler process, and have completed the present disclosure.

SUMMARY OF INVENTION

Technical Problem

An object of one embodiment of the present disclosure is to provide a manufacturing method in which it is easy to manufacture a fine structure having chirality by greatly improving precision of a process of giving chirality, and maximizing the easiness of the process in terms of process efficiency and technical means.

Another object of one embodiment of the present disclosure is to provide a method of efficiently manufacturing a chiral nano-structure, which can give structural chirality through a significantly simplified means compared to the conventional means, and secure immediate and real-time properties even in the modulation of additional chirality.

Solution to Problem

A method of manufacturing a chiral nano-structure according to one embodiment of the present disclosure includes a magnetic field forming operation that forms a magnetic field; a particle arranging operation that arranges at least two nanoparticles in the magnetic field; and a magnetic field adjusting operation that adjusts at least one of a magnetic flux density, a magnetization direction, and a spatial range of the magnetic field, in which in the magnetic field adjusting operation, the arrangement of the nanoparticles arranged in the magnetic field is aligned to correspond to a structure of the magnetic field, and the entire structure is formed as a nano-structure having chirality.

In the magnetic field forming operation, the magnetic field can be a spiral magnetic field.

In the magnetic field forming operation, the magnetic field can be a spiral magnetic field formed by relatively rotating at least two magnetic substances.

The nanoparticle can include a magnetoplasmonic particle.

The magnetoplasmonic particles can include a core-shell particles having a core; and a shell surrounding at least a part of the surface of the core and provided with a shell including a component different from that of the core.

In the core-shell particle, any one of the core and the shell can include a magnetic component and the other can include a metal component.

The metal component can contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

The magnetic component can contain one selected from the group consisting of iron oxide ($Fe_3O_4$), nickel oxide (NiO), cobalt oxide ($Co_3O_4$), iron (Fe), nickel (Ni), cobalt (Co), and combinations thereof.

In the particle arrangement operation, the nanoparticles can be arranged in a state of being dispersed in a solvent or a dispersion medium.

The solvent or the dispersion medium can contain one selected from the group consisting of distilled water, deionized water, alcohol, organic solvent, polymer, and combinations thereof.

In the magnetic field forming operation, the magnetic field can be a spiral magnetic field formed by relatively rotating at least two magnetic substances, and in the magnetic field adjusting operation, the magnetization direction can be adjusted by changing at least one of an angle at which the at least two magnetic substances are relatively rotated and the degree at which the at least two magnetic substances are parallel to each other.

In the magnetic field forming operation, the magnetic field can be a spiral magnetic field formed by relatively rotating at least two magnetic substances, and in the magnetic field adjusting operation, the spatial range of the magnetic field can be adjusted by changing a straight distance between the at least two magnetic substances.

In the magnetic field forming operation, the magnetic field can be a spiral magnetic field formed by relatively rotating at least two magnetic substances, and in the magnetic field adjusting operation, the magnetic flux density of the magnetic field can be adjusted by changing at least one of magnetic forces of the at least two magnetic substances and a straight distance between the at least two magnetic substances.

An apparatus for forming a spiral magnetic field for manufacturing a chiral nano-structure according to another embodiment of the present disclosure includes a first magnetic substance unit forming a magnetic field; a second magnetic substance unit spaced apart from the first magnetic substance unit by a predetermined interval; and a receptor unit located between the first magnetic substance unit and the second magnetic substance unit to receive nanoparticles, in which the first magnetic substance unit and the second magnetic substance unit can be rotated in opposite directions with respect to a virtual center line simultaneously passing through the first magnetic substance unit and the second magnetic substance unit.

The first magnetic substance unit and the second magnetic substance unit can have a panel shape having a predetermined thickness.

The first magnetic substance unit and the second magnetic substance unit can be rotated at the same speed.

Advantageous Effects of Invention

The method of manufacturing the chiral nano-structure according to one embodiment provides an advantage of manufacturing a large amount of chiral nano-structures by the relatively simple method through the magnetic application and adjustment means, and has advantages of improving the process easiness and efficiency and furthermore, improving precision compared to the conventional method that uses the chemical synthesis method, uses the separate template, etc.

In addition, it is possible to secure the immediate real-time property in the modulation of the additional chirality as necessary as well as in the case of initially giving chirality.

The chiral nano-structure manufactured by the method of manufacturing the chiral nano-structure can be widely used in various optical devices and bio-sensor fields requiring the polarization function, and in particular, has the chiral property capable of the precise and immediate modulation, and thus can serve as the active and dynamic optical activation means for the next-generation displays such as 3Ds or holographic displays that require the ultra-high-speed conversion, the real-time adjustment, and the sophisticated color expression.

BRIEF DESCRIPTION OF DRAWINGS

FIG. 1 schematically shows a flowchart of a method of manufacturing a chiral nano-structure according to one embodiment.

FIG. 2 schematically shows a magnetic field forming operation according to one embodiment.

FIG. 3 schematically shows a magnetic substance rotation state in the magnetic field forming operation according to one embodiment.

FIG. 4 schematically shows a particle arranging operation according to one embodiment.

FIG. 5(a), FIG. 5(b) and FIG. 5(c) schematically show cross-sections of nanoparticles of various types capable of giving chirality through the method of manufacturing the chiral nano-structure according to one embodiment.

FIG. 6 shows a photograph showing a spherical core-shell particle according to one embodiment.

FIG. 7 shows a photograph showing a rod-shaped core-shell particle according to one embodiment.

FIG. 8 is a perspective diagram schematically showing a part of the chiral nano-structure manufactured by the method of manufacturing the chiral nano-structure according to one embodiment.

FIG. 9 [a]-9 [h] shows the circular dichroism spectroscopy (CD) for each concentration and rotation angle of the chiral nano-structure manufactured in Example 1.

FIG. 10 [a]-10 [h] shows the circular dichroism spectroscopy (CD) for each concentration and rotation angle of the chiral nano-structure manufactured in Example 2.

FIG. 11 [a]-11 [h] shows the circular dichroism spectroscopy (CD) for each concentration and rotation angle of the chiral nano-structure manufactured in Example 3.

FIG. 12 [a]-12 [h] shows the circular dichroism spectroscopy (CD) for each concentration and rotation angle of the chiral nano-structure manufactured in Example 4.

FIG. 13(a) and FIG. 13(b) show a concept of a configuration of a manufacturing apparatus according to one embodiment of the present disclosure.

FIG. 14(a), FIG. 14(b) and FIG. 14(c) show the principle of the manufacturing apparatus according to one embodiment of the present disclosure.

DESCRIPTION OF EMBODIMENTS

A method of manufacturing a chiral nano-structure according to one embodiment of the present disclosure includes a magnetic field forming operation that forms a magnetic field; a particle arranging operation that arranges at least two nanoparticles in the magnetic field; and a magnetic field adjusting operation that adjusts at least one of a magnetic flux density, a magnetization direction, and a spatial range of the magnetic field, in which in the magnetic field adjusting operation, the arrangement of the nanoparticles arranged in the magnetic field is aligned to correspond to a structure of the magnetic field, and the entire structure is formed as a nano-structure having chirality.

An apparatus for forming a spiral magnetic field for manufacturing a chiral nano-structure according to another embodiment of the present disclosure includes a first magnetic substance unit forming a magnetic field; a second magnetic substance unit spaced apart from the first magnetic substance unit by a predetermined interval; and a receptor unit located between the first magnetic substance unit and the second magnetic substance unit to receive nanoparticles, in which the first magnetic substance unit and the second magnetic substance unit can be rotated in opposite directions with respect to a virtual center line simultaneously passing through the first magnetic substance unit and the second magnetic substance unit.

Advantages and features of the present disclosure, and a method for achieving them will become apparent with reference to the embodiments described below. However, the present disclosure is not limited to the embodiments disclosed below but can be implemented in various different forms, and only the present embodiment serves to complete the disclosure of the present disclosure, and to fully inform those skilled in the art to which the present disclosure pertains of the scope of the disclosure, and the present disclosure is only defined by the scope of the claims.

In the drawings of the present specification, parts are enlarged or exaggerated as necessary to clearly express various layers and regions. The same reference numerals refer to the same components throughout the specification.

In this specification, the meaning of 'or more' is interpreted as including the corresponding number or more cases. For example, 'two or more' means two or more cases. In addition, the description of 'X to Y' for a numerical range is interpreted as a range including X or Y. For example, '25 to 50' means a numerical range including 25 and 50.

One embodiment of the present disclosure provides a method of manufacturing a chiral nano-structure including a magnetic field forming operation that forms a magnetic field; a particle arranging operation that arranges at least two nanoparticles in the magnetic field; and a magnetic field adjusting operation that adjusts at least one of a magnetic flux density, a magnetization direction, and a spatial range of the magnetic field, in which in the magnetic field adjusting operation, the arrangement of the nanoparticles arranged in the magnetic field is aligned to correspond to a structure of the magnetic field, and the entire structure is formed as a nano-structure having chirality.

Through the method of manufacturing the chiral nano-structure, it is possible to manufacture a three-dimensional nano-structure having chirality. Chirality refers to the property of asymmetry. Structurally, the particle structure having this chirality can be usefully applied to an optical technology field such as a liquid crystal display (LCD) or a bio field such as pharmaceuticals. The method of manufacturing the chiral nano-structure can provide a means capable of manufacturing a large amount of particle structures having high purity chirality, and the thus manufactured three-dimensional nano-structure can serve as a material with greater potential to pioneer new research fields from the pharmaceutical and bio fields to the optical device fields.

FIG. 1 schematically shows a flowchart of a method of manufacturing a chiral nano-structure according to one embodiment. Referring to FIG. 1, a manufacturing method 100 can include a magnetic field formation operation 10, a particle arranging operation 20, and a magnetic field adjusting operation 30.

The magnetic field forming operation 10 is a basic operation of manufacturing a chiral nano-structure, and accordingly, a magnetic field having a predetermined magnetic flux density and a magnetization direction can be formed within a predetermined spatial range.

In the magnetic field forming operation 10, the magnetic field is not especially limited as long as it has a structure that can finally give chirality to the nano-structure, but can be, for example, a magnetic field of a spiral structure. When the magnetic field is the spiral magnetic field, the magnetic field has chirality resulting from the spiral structure. At this time, structural chirality induced from the magnetic field can be transferred to the nanoparticles, and thus the aligned structure of the nanoparticles can be manufactured to have chirality resulting from the spiral structure.

Specifically, in the magnetic field forming operation, the magnetic field can be formed as a spiral magnetic field by relatively rotating at least two magnetic substances. FIG. 2 schematically shows a magnetic field forming operation 10 according to one embodiment. Referring to FIG. 2, the magnetic field forming operation 10 can use two magnetic substances 11, 12. The two magnetic substances 11, 12 can be disposed to face each other in the same magnetization direction (y-axis direction) and then relatively rotated in opposite directions to form a spiral magnetic field 13.

FIG. 3 is a schematic diagram showing a case of rotating each of the two magnetic substances 11, 12 but rotating each of the two magnetic substances 11, 12 in opposite directions in a y-axis direction. Referring to FIG. 3, one magnetic substance 11 can be rotated clockwise so that an angle $\theta 1$ between its long axis L1 and a z-axis is in the range of $0° < \theta 1 < 180°$, and the other magnetic substance 12 can be rotated counterclockwise so that an angle $\theta 2$ between its long axis L2 and the z axis is in the range of $0° > \theta 2 > -180°$. A structure of the spiral magnetic field can be determined by adjusting $\theta 1$ and $\theta 2$.

According to one embodiment, the two magnetic substances 11, 12 can be rotated so that the absolute values of $\theta 1$ and $\theta 2$ have the same size. In addition, the structure of the spiral magnetic field 13 can be determined by adjusting the sizes of $\theta 1$ and $\theta 2$. The spiral magnetic field 13 exhibits chirality by having a mirror surface asymmetric structure, and the degree of chirality can be adjusted depending on the sizes of $\theta 1$ and $\theta 2$. When the sizes of the absolute values of $\theta 1$ and $\theta 2$ are referred to as $\theta$, the size of the chirality of the spiral magnetic field can be proportional to the size of $\sin(2\theta)$.

According to one embodiment, the two magnetic substances 11, 12 can independently include a neodymium magnet, a ferrite magnet, or an electromagnet, respectively. Specifically, a magnetic flux density of the magnetic substance can be from about 1 μT to about 5 T, for example, from about 0.01 T to about 0.4 T, for example, from about 0.01 T to about 0.3 T.

According to one embodiment, a separation distance of the magnetic substance defined as a straight distance connecting the centers of the two magnetic substances 11, 12 can be about 1 μm to about 10 m, for example, about 1 μm to about 5 m, for example, from about 1 μm to about 1 m, for example, from 1 μm to about 80 cm, for example, from about 1 cm to about 50 cm, for example, from about 1 cm to about 10 cm, for example, from about 1 cm to about 8 cm, for example, from about 1 cm to about 6 cm, for example, from about 1 cm to about 5 cm, for example, from about 1 cm to about 4 cm.

The manufacturing method 100 includes a particle arranging operation 20 of arranging at least two or more of the nanoparticles in the magnetic field. FIG. 4 schematically shows the particle arranging operation 20.

The particle arranging operation 20 is an operation of disposing target particles for giving chirality in the magnetic field generated in the magnetic field forming operation 10. The particle arranging operation 20 can also be performed before the magnetic field forming operation 10, or can also be performed after the magnetic field forming operation 10. In other words, the nanoparticles can also be arranged in a region where the magnetic field is to be formed in advance before the magnetic field is formed, or can also be arranged in a region where the magnetic field is formed after the magnetic field is formed.

FIG. 4 exemplarily shows a case where the particles are arranged before the magnetic field forming operation 10. Referring to FIG. 4, in the particle arranging operation 20, the nanoparticles can be arranged in the magnetic field in a state of being dispersed in a solvent or a dispersion medium. Specifically, this can be performed in a method of manufacturing a colloidal solution 21 containing at least two or more of the nanoparticles, and then arranging the colloidal solution 21 in the magnetic field.

The concentration of the nanoparticles in the colloidal solution 21 can be, for example, about 5 µg/mL to about 500 mg/mL, for example, about 5 µg/mL to about 400 mg/mL, for example, about 10 mg/mL to about 400 mg/mL. By dispersing the nanoparticles in the aforementioned concentration range to apply the dispersed nanoparticles to the manufacturing method, it may be advantageous for the nanoparticles to be arranged in an aligned structure having chirality without agglomeration, and a three-dimensional chiral nano-structure consisting of at least two or more of the nanoparticles can be precisely formed.

The solvent or the dispersion medium can contain one selected from the group consisting of distilled water, deionized water, alcohol, organic solvent, polymer, and combinations thereof, but is not limited thereto. It is understood that the 'polymer' is a polymer having a weight average molecular weight (Mw) of about 500 or more, and collectively refers to a hydrophilic, hydrophobic, or amphiphilic liquid state or solid state polymer that can have a viscosity of about 5 cP to 6000 cP at room temperature, consist of one type or a mixture of two or more types, and serve as a dispersion medium of the nanoparticles.

The method of manufacturing the chiral nano-structure is a method of aligning the nanoparticles in a predetermined arrangement to have structural chirality, and can manufacture various chiral nano-structures depending on the components and structures of the nanoparticles.

According to one embodiment, the nanoparticles can contain magnetoplasmonic particles. Plasmon refers to a phenomenon in which free electrons inside a metal vibrate collectively. For metal nanoparticles, plasmon can exist locally on the surface, which can be referred to as surface plasmon. When the metal nanoparticles meet the electric field of light in the range from visible light to near infrared light, light absorption occurs by surface plasmon resonance (SPR) to express a vivid color. The magnetoplasmonic particles are plasmon particles having magnetism, and can be aligned in a predetermined arrangement in the magnetic field by magnetism, and colored by the plasmon phenomenon.

Specifically, the magnetoplasmonic particles can include a core; and a core-shell particles surrounding at least a part of the surface of the core and provided with a shell including a component different from that of the core.

For example, in the core-shell particles, one of the core and the shell can include a magnetic component, and the other can include a metal component. It can be advantageous to form the precise chiral structure by implementing the desired color of the nano-structure and at the same time, aligning the nano-structure in the magnetic field in the predetermined arrangement through the core containing the magnetic component and the shell containing the metal component; or a combination of the core containing the magnetic component and the shell containing the metal component.

The metal component can contain one selected from the group consisting of, for example, silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd) and combinations thereof.

The magnetic component can contain one selected from the group consisting of, for example, iron oxide ($Fe_3O_4$), nickel oxide (NiO), cobalt oxide ($Co_3O_4$), iron (Fe), nickel (Ni), cobalt (Co), and combinations thereof.

According to one embodiment, the core can contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof, and the shell can contain one selected from the group consisting of iron oxide ($Fe_3O_4$), nickel oxide (NiO), cobalt oxide ($Co_3O_4$), iron (Fe), nickel (Ni), cobalt (Co), and combinations thereof.

According to another embodiment, the core can contain one selected from the group consisting of iron oxide ($Fe_3O_4$), nickel oxide (NiO), cobalt oxide ($Co_3O_4$), iron (Fe), nickel (Ni), cobalt (Co), and combinations thereof, and the shell can contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

Through this core-shell structure, there are advantages in that the nano-structure can implement the expression of excellent colors and optical properties, and it is easy to adjust the nanoparticles to be aligned in the desired arrangement in the magnetic field, and it is possible to obtain an advantage in that it is advantageous for adjusting chirality by finely adjusting the magnetic field to change the arrangement in real time.

FIG. 5 schematically shows cross sections of various types of nanoparticles capable of giving chirality through the manufacturing method. Referring to (a) and (b) of FIG. 5, the nanoparticles can be spherical core-shell particles, and referring to (c) of FIG. 5, the nanoparticles can be rod-shaped core-shell particles. Specifically, the spherical core-shell particles can also have a structure including the core 14 and the shell 15 surrounding substantially the entire surface thereof, as shown in (a) of FIG. 5, and also have a half-shell structure including the core 14 and the shell 15 surrounding a part of the surface thereof, as shown in (b) of FIG. 5.

In the present specification, the term 'spherical shape' should be interpreted as including not only a case where the cross-section is geometrically perfect circular shape, but also a range that can be recognized as a shape of a sphere in the overall three-dimensional structure within a predetermined error range even when it is an oval shape.

In the present specification, the term of 'half-shell' is understood as having not only a case where the shell 15 surrounds exactly half of the surface area of the core 14, but also a case where the shell 15 surrounds at least a part other than the entire surface area.

Referring to (c) of FIG. 5, the core-shell particles can be rod-shaped core-shell particles. As in the spherical core-shell particles, the rod-shaped core-shell particles can also have a structure including the core 14 and the shell 15 surrounding substantially the entire surface thereof, and can also have a structure (not shown) including the shell 15 surrounding a part of the surface of the core 14.

In the present specification, the term 'bar-shaped' refers to a shape in which the length and width form a predetermined aspect ratio with respect to the cross section, and can be understood as encompassing all three-dimensional shapes in which the ratio of the length to the width exceeds 2.00.

According to one embodiment, the nanoparticles can include the spherical core-shell particles or the rod-shaped core-shell particles, and the spherical core-shell particles or the rod-shaped core-shell particles can include a core; and a shell surrounding the entire surface of the core and including a component different from the component of the core, in which the core can contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof, and the shell can contain one selected from the group consisting of iron oxide ($Fe_3O_4$), nickel oxide (NiO), cobalt oxide ($Co_3O_4$), iron (Fe), nickel (Ni), cobalt (Co), and combinations thereof.

For example, the core can contain silver (Ag), gold (Au), or a combination thereof, and the shell can contain iron oxide ($Fe_3O_4$). The nanoparticles can have the core-shell structure including a combination of these components, thereby precisely giving the desired chirality by adjusting the magnetic field, and maximizing the effect of adjusting the chirality immediately by the change in the magnetic field.

According to another embodiment, the nanoparticles can include the spherical core-shell particles or the rod-shaped core-shell particles, and the spherical core-shell particles or the rod-shaped core-shell particles can include a core; and a half-shell surrounding a part of the core and including a component different from the component of the core, in which the core can contain one selected from the group consisting of iron oxide ($Fe_3O_4$), nickel oxide (NiO), cobalt oxide ($Co_3O_4$), iron (Fe), nickel (Ni), cobalt (Co), and combinations thereof, and the shell can contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

For example, the core can contain iron oxide ($Fe_3O_4$), and the shell can contain silver (Ag), gold (Au), or a combination thereof. The nanoparticles can have the core-shell structure including a combination of these components, thereby precisely giving the desired chirality by adjusting the magnetic field, and maximizing the effect of adjusting the chirality immediately by the change in the magnetic field.

FIG. 6 shows a photograph of the spherical core-shell particles according to one embodiment, and FIG. 7 shows a photograph of the rod-shaped core-shell particles according to one embodiment.

According to one embodiment, the spherical core-shell particles can have an average particle diameter of the core of about 0.01 nm to about 300 nm, for example, about 5 nm to about 250 nm, for example, about 5 nm to about 100 nm, for example, about 5 nm to about 90 nm, for example, about 5 nm to about 80 nm, for example, about 20 nm to about 80 nm, for example, about 40 nm to 80 nm.

The average thickness of the shell of the spherical core-shell particles can be from about 1 nm to about 150 nm, for example, from about 1 nm to about 120 nm, for example, from about 1 nm to about 100 nm, for example, from about 1 nm to about 80 nm, for example, from about 5 nm to about 80 nm, for example, from about 10 nm to about 80 nm, for example, from about 10 nm to about 70 nm, for example, from about 20 nm to about 60 nm, for example, from about 30 nm to about 60 nm, for example, about 40 nm to about 60 nm.

In the spherical core-shell particles, an aspect ratio defined as a ratio (L/S) of a long diameter (L) and a short diameter (S) of the core with respect to the cross section can be from about 1.00 to about 2.00, for example, from about 1.00 to about 1.80, for example, from about 1.00 to about 1.75, for example, from about 1.00 to about 1.70, for example, from about 1.00 to about 1.65, for example, from about 1.00 to about 1.60.

According to one embodiment, the rod-shaped core-shell particles can have an average width of the core of about 0.01 nm to about 100 nm, for example, about 5 nm to about 100 nm, for example, about 5 nm to about 90 nm, for example, about 5 nm to about 80 nm, for example, about 20 nm to about 80 nm, for example, about 40 nm to 80 nm.

The average thickness of the shell of the rod-shaped core-shell particles can be from about 1 nm to about 150 nm, for example, from about 1 nm to about 120 nm, for example, from about 1 nm to about 100 nm, for example, from about 1 nm to about 80 nm, for example, from about 5 nm to about 80 nm, for example, from about 10 nm to about 80 nm, for example, from about 10 nm to about 70 nm, for example, from about 20 nm to about 60 nm, for example, from about 30 nm to about 60 nm, for example, from about 40 nm to about 60 nm.

In the rod-shaped core-shell particles, the aspect ratio defined as the ratio (L/W) of the length (L) and width (W) of the core can be greater than about 2.00 and about 40.00 or less, for example, from about 5.00 to about 40.00, for example, from about 10.00 to about 40.00, for example, from about 15.00 to about 35.00.

In the structures of the spherical core-shell particles and the rod-shaped core-shell particles, all of the average particle diameter of the core, the average width of the core, the average thickness of the shell, the long and short diameters of the core, and the length and width of the core have two-dimensional values measured with respect to the cross section of the particle, and can be obtained from a projection image obtained through a means such as a scanning electron microscope (SEM) or a transmission electron microscope (TEM). In the average particle diameter of the core, the average width of the core, and the average thickness of the shell, the term of 'average' refers to 'number average'. In the spherical core-shell particles, for any one core, the longest particle diameter is defined as the long diameter of the core, and the shortest particle diameter is defined as the short diameter of the core. In the rod-shaped core-shell particles, for any one core, the relatively longer length of the width and the length is referred to as the length of the core, and the relatively short length thereof is referred to as the width of the core. In the spherical and rod-shaped core-shell particles, the thickness of the shell refers to a vertical straight distance from an interface between the core and the shell to an outer surface of the shell.

The method of manufacturing the chiral nano-structure includes a magnetic field adjusting operation 30 of adjusting at least one of the magnetic flux density, the magnetization direction, and the spatial range of the magnetic field. The magnetic field adjusting operation 30 is an operation of giving the desired level of chirality to the nanoparticles arranged in the magnetic field by changing the magnetic field formed in the magnetic field forming operation 10. The magnetic field adjusting operation can also be performed simultaneously with the magnetic field forming operation, and can also be performed with a predetermined time difference. In other words, the magnetic field forming operation can also form the magnetic field having the desired structure by adjusting at least one of the magnetic flux density, the magnetization direction, and the spatial range of the magnetic field while forming the magnetic field; or can also form the magnetic field having another structure by adjusting at least one of the magnetic flux density, the magnetization direction, and the spatial range of the magnetic field first formed in the magnetic field forming operation later. For example, the former case can include a case where chirality is first given to a non-chiral nanoparticle dispersion, and the latter case can include a case where different chirality is given to the nano-structure having the existing chirality.

In the magnetic field adjusting operation 30, the final alignment structure is adjusted to correspond to the chirality of the magnetic field by changing the arrangement of the nanoparticles arranged in the magnetic field, so that the nano-structure having chirality can be finally formed. When the arrangement of the nanoparticles arranged in the magnetic field is aligned to correspond to the structure of the magnetic field, it means that the alignment structure by the arrangement of the nanoparticles does not have chirality and then the chirality of the magnetic field is transferred to have chirality, or have chirality different from the existing chirality.

Referring to FIGS. 2 and 3, when the magnetic field formed in the magnetic field forming operation 30 is, for example, a spiral magnetic field, the magnetic field has chirality induced from a mirror surface asymmetric structure. At this time, at least two or more nanoparticles arranged in the magnetic field through the particle arranging operation 20 receive the structural chirality of the spiral magnetic field through the change in the arrangement by the magnetic field to form the alignment structure having the substantially the same level of chirality. Accordingly, when at least one of the magnetic flux density, the magnetization direction, and the spatial range of the magnetic field is changed, the chirality of the magnetic field is changed, so that the chirality of the alignment structure of the nanoparticles arranged in the magnetic field is also changed. For example, when the magnetic flux density is increased in the magnetic field adjusting operation, a peak on a circular dichroism spectroscopy graph of the nano-structure is moved toward a shorter wavelength.

For example, in the magnetic field forming operation 10, the magnetic field can be a spiral magnetic field formed by relatively rotating at least two magnetic substances, and in the magnetic field adjusting operation 30, the magnetization direction of the magnetic field can be adjusted by changing at least one of an angle obtained by relatively rotating the at least two magnetic substances; and the degree at which the at least two magnetic substances are parallel to each other.

For example, in the magnetic field forming operation 10, the magnetic field can be a spiral magnetic field formed by relatively rotating at least two magnetic substances, and in the magnetic field adjusting operation 30, the spatial range of the magnetic field can be adjusted by changing a straight distance between the at least two magnetic substances.

For example, in the magnetic field forming operation 10, the magnetic field can be a spiral magnetic field formed by relatively rotating at least two magnetic substances, and in the magnetic field adjusting operation 30, the magnetic flux density of the magnetic field can be adjusted by changing at least one of the magnetic force of the at least two magnetic substances; and the straight distance between the at least two magnetic substances.

Through the method of manufacturing the chiral nano-structure, it is possible to manufacture the aforementioned chiral nano-structure. In addition, a chiral nano-structure satisfying Equation 1 below can be manufactured through the method of manufacturing the chiral nano-structure.

$$0 \leq \frac{A \times B \times C}{P_{max}} \leq 3.5 \qquad \text{Equation 1A}$$

In Equation 1, A refers to a value of a ratio of the average particle diameter (nm) of the core to the average thickness (nm) of the shell of the nanoparticles; or a ratio of the average width (nm) of the core to the average thickness (nm) of the shell, B refers to a value of the concentration (µg/mL) of the nanoparticles, and C refers to a ratio of the relative chirality sizes in a case where the size value of the chirality (τ) is 1.0 when a rotation angle (θ) of the spiral magnetic field applied to the chiral nano-structure is 45°, and Pmax refers to an absolute value of a maximum peak value of the circular dichroism spectroscopy under the B and C conditions of the nano-structure satisfying A.

The description of Equation 1 and each factor constituting Equation 1 is the same as described above in connection with the chiral nano-structure.

The method of manufacturing the chiral nano-structure according to one embodiment provides an advantage of manufacturing a large amount of chiral nano-structures by the relatively simple method through the magnetic application and adjustment means, and has advantages of improving the process easiness and efficiency and furthermore, improving precision compared to the conventional method that uses the chemical synthesis method, uses the separate template, etc.

The chiral nano-structure manufactured by the method of manufacturing the chiral nano-structure can be widely used in various optical devices and bio-sensor fields requiring the polarization function, and in particular, has the chiral property capable of the precise and immediate modulation, and thus can serve as the active and dynamic optical activation means for the next-generation displays such as 3Ds or holographic displays that require the ultra-high-speed conversion, the real-time adjustment, and the sophisticated color expression.

In the method of manufacturing the chiral nano-structure, the magnetic field is a spiral magnetic field in the magnetic field forming operation, the nanoparticles include magnetoplasmonic particles, the magnetoplasmonic particles include core-shell particles having the core; and the shell surrounding at least a part of the surface of the core and including a component different from the component of the core, and a value of Equation 1 below the chiral nano-structure can satisfy 0 to 20.

$$\frac{A \times B \times C}{P_{max}} \qquad \text{Equation 1}$$

In Equation 1, A refers to a value of a ratio of the average particle diameter (nm) of the core to the average thickness (nm) of the shell of the nanoparticles; or a ratio of the average width (nm) of the core to the average thickness (nm) of the shell, B refers to a value of the concentration (µg/mL) of the nanoparticles, and C refers to a ratio of the relative chirality sizes in a case where the size value of the chirality (τ) is 1.0 when a rotation angle (θ) of the spiral magnetic field is 45°, and Pmax refers to an absolute value of a maximum peak value of the circular dichroism spectroscopy under the B and C conditions of the nano-structure satisfying A.

According to one embodiment, the value of Equation 1 can be a result when B is any one of about 25 to about 200 and a result when C is any one of about 0 to about 1.0. When the value of Equation 1 derived from these concentration and angle conditions satisfies the range of about 0 to about 20, the value of Equation 1 and the real-time chiral variability and structural integrity of the chiral nano-structure can be greatly improved.

The value of Equation 1 does not have to satisfy about 0 to about 20 in all the aforementioned ranges of B and C, but when any one value of B and any one value of C in each of the aforementioned ranges satisfies a specific value within the range of about 0 to about 20, it may be an indicator indicating that the chiral nano-structure has secured the desired real-time variability and structural chiral integrity. However, as the number of cases where the range of the value of Equation 1 satisfies the corresponding range within the aforementioned ranges of B and C increases, it represents a correlation that the real-time variability and the structural chiral integrity are improved.

When the nanoparticles are the spherical core-shell particles, A refers to a value of the ratio (D/T) of the average particle diameter (D) of the core to the average thickness (T) of the shell. When the nanoparticles are the rod-shaped core-shell particles, A refers to a value of the ratio (W/T) of the average width (W) of the core to the average thickness (T) of the shell.

B refers to a value of the concentration (µg/mL) of the nanoparticles in the chiral nano-structure. As described above, in the particle arranging operation 20 according to one embodiment, the nanoparticles can be arranged in a state of the colloidal solution 21 dispersed in a solvent or a dispersion medium. At this time, B refers to a value of the concentration (µg/mL) of the nanoparticles in the colloidal solution 21. Specifically, when a chiral nano-structure from a non-chiral nanoparticle dispersion through the method of manufacturing the chiral nano-structure; and when another chiral nano-structure is manufactured by changing the chirality of one chiral nano-structure, B in both cases can be defined as the value of the concentration (µg/mL) of the nanoparticles in the solution.

C refers to the ratio of the relative chirality sizes in a case where the size value of chirality (τ) is 1.0 when the rotation angle (θ) of the spiral magnetic field applied to the chiral nano-structure is 45°. More specifically, the rotation angle (θ) can refer to a rotation angle (θ) of each of two magnetic substances relatively rotated to form the spiral magnetic field. The chirality of the chiral nano-structure can be given by applying the spiral magnetic field. In addition, as described above, the chiral nano-structure can have the characteristic in which chirality is changed by applying the spiral magnetic field. When the spiral magnetic field is applied to the nano-structure in order to give or change chirality, the spiral magnetic field can be formed by the relative rotation of two opposing magnetic substances. As the rotation angles (θ) of the two magnetic substances vary, the chirality of the nano-structure also varies.

Specifically, the size of the chirality (τ) of the spiral magnetic field can be proportional to the size value of sin(2θ). For example, a ratio of the relative sizes of the chirality when each of the rotation angles (θ) of the two magnetic substances is 15° and 165° is 0.5 based on the size of the chirality (τ) of 1.0 when the rotation angle (θ) of the spiral magnetic field is 45°.

The Pmax refers to a maximum peak value (mdeg) when the circular dichroism spectroscopy is measured for the chiral nano-structure manufactured through the manufacturing method. For example, when two or more peaks are derived from different wavelength regions, it means a value for one peak having the greatest absolute value of the peak value. The Pmax refers to an absolute value and is expressed as a positive (+) value.

According to one embodiment, for the chiral nano-structure manufactured through the method of manufacturing the chiral nano-structure, when the value of Equation 1 satisfies about 0 to about 20, it is possible to implement the effect that a modulation rate of the chirality is much faster than that of the related art, and to have a self-assembly property substantially changed in real time.

According to one embodiment, when the nanoparticles include spherical core-shell particles and the shell has a structure of substantially surrounding the entire surface of the core, the value of Equation 1 can be about 0 to about 3.0, for example, from about 0 to about 2.5, for example, from about 0 to about 1.5, for example, from about 0 to about 1.0. At this time, for example, the nanoparticles can be the core-shell particles having the core including the metal component; and the shell including the magnetic component.

When the nanoparticles include the spherical core-shell particles, the shell has a structure of substantially surrounding the entire surface of the core, and C is any one value greater than 0 (zero), the value of Equation 1 can be from about 0.01 to about 3.5, for example, from about 0.01 to about 3.0, for example, from about 0.01 to about 2.5, for example, from about 0.01 to about 1.5, for example, from about 0.01 to about 1.0.

When the nanoparticles include spherical core-shell particles, the shell has a structure of substantially surrounding the entire surface of the core, C is any one value greater than 0 (zero), and B is any one value in the range of 50 to 200, the value of Equation 1 can be from about 0.01 to about 1.0, for example, from about 0.01 to about 0.80, for example, from about 0.01 to about 0.50.

According to another embodiment, when the nanoparticles include spherical core-shell particles, and the shell has a half-shell structure of substantially surrounding a part of the surface of the core, the value of Equation 1 can be about 0 to about 19.00, for example, from about 0 to about 18.00, for example, from about 0 to about 17.00. At this time, for example, the nanoparticles can be core-shell particles having the core including the magnetic component and the shell including the metal component.

When the nanoparticles include spherical core-shell particles, the shell is a half-shell structure of substantially surrounding a part of the surface of the core, and C is any one value greater than 0 (zero), the value of Equation 1 can be from about 1.00 to about 19.00, for example, from about 1.50 to about 19.00, for example, from about 2.00 to about 18.00, for example, from about 2.50 to about 17.00.

The nanoparticles include spherical core-shell particles, the shell has a half-shell structure of substantially surrounding a part of the surface of the core, and C is any one value greater than 0 (zero), and B is any one value in the range of 50 to 200, the value of Equation 1 can be from about 1.00 to about 17.00, for example, from about 1.00 to 15.00, for example, from about 1.00 to 14.00.

According to another embodiment, when the nanoparticles include rod-shaped core-shell particles and the shell has a structure of substantially surrounding the entire surface of the core, the value of Equation 1 can be about 0 to about 3.0. At this time, for example, the nanoparticles can be the core-shell particles having the core including the metal component and the shell including the magnetic component.

When the nanoparticles include rod-shaped core-shell particles, the shell has a structure of substantially surrounding the entire surface of the core, and C is any one value greater than 0 (zero), the value of Equation 1 can be about 0.1 to about 3.5, for example, about 0.1 to about 3.0, for example, about 0.2 to about 3.5, for example, about 0.2 to about 3.5, for example, about 0.3 to about 3.5, for example, from about 0.3 to about 3.0.

The nanoparticles include rod-shaped core-shell particles, the shell has a structure of substantially surrounding the entire surface of the core, C is any one value greater than 0 (zero), and B is any one value in the range of 75 to 200, the value of Equation 1 can be from about 0.1 to about 3.0, for example, from about 0.1 to about 2.0, for example, from about 0.1 to about 1.8.

FIG. 8 is a perspective diagram schematically showing a part of a chiral nano-structure 200 manufactured by the method of manufacturing the chiral nano-structure according to one embodiment.

The chiral nano-structure 200 is manufactured by the method 100 of manufacturing the chiral nano-structure, and referring to FIGS. 2 and 8, the chiral nano-structure 200 can receive chirality of the spiral magnetic field 13 formed in the magnetic field forming operation 10 to have a structural chirality corresponding thereto.

Specifically, the chiral nano-structure 200 can include two or more nanoparticle arrangement structures 210 in a three-dimensional space. Each of the nanoparticle arrangement structures 210 includes at least one nanoparticle 22, and the nanoparticle 22 has a predetermined arrangement.

The nanoparticle arrangement structure 210 can include a first structure 201 including at least one nanoparticle 22; and at least one nanoparticle 22, and include a second structure 202 disposed to be spaced apart from the first structure 201. The first structure 201 and the second structure 202 refer to arbitrary two adjacent structures among the two or more nanoparticle arrangement structures 210. The components and structures of the nanoparticles 22 included in the first structure 201 and the nanoparticles 22 included in the second structure 202 can be the same or different.

According to one embodiment, the separation straight distance between the first structure 201 and the second structure 202 can be about 0.01 nm to about 50 The separation distance between any two structures can be adjusted in the above range, so that a variable speed of chirality of the nanoparticle arrangement structure can be quickly implemented to a desired level, and the nanoparticle arrangement structure can be applied to the optical or bio fields to implement an optimal function.

As described above, the method of manufacturing the chiral nano-structure can be an efficient and useful means for the technical purpose of giving chirality to non-chiral nanoparticles or modulating chirality to have chirality different from the existing chirality. More specifically, the method of manufacturing the chiral nano-structure provides an advantage of manufacturing a large amount of chiral nano-structures by the relatively simple method through the magnetic application and adjustment means, and has advantages of improving the process easiness and efficiency and furthermore, improving precision compared to the conventional method that uses the chemical synthesis method, uses the separate template, etc. In addition, there is an advantage of securing the immediate real-time property in giving or modulating chirality.

The chiral nano-structure manufactured by the method of manufacturing the chiral nano-structure can be widely used in various optical devices and bio-sensor fields requiring the polarization function, and in particular, has the chiral property capable of the precise and immediate modulation, and thus can serve as the active and dynamic optical activation means for the next-generation displays such as 3Ds or holographic displays that require the ultra-high-speed conversion, the real-time adjustment, and the sophisticated color expression.

An apparatus for forming a spiral magnetic field for manufacturing a chiral nano-structure according to another embodiment of the present disclosure includes a first magnetic substance unit forming a magnetic field; a second magnetic substance unit spaced apart from the first magnetic substance unit by a predetermined interval; and a receptor unit located between the first magnetic substance unit and the second magnetic substance unit to receive nanoparticles, in which the first magnetic substance unit and the second magnetic substance unit can be rotated in opposite directions with respect to a virtual center line simultaneously passing through the first magnetic substance unit and the second magnetic substance unit.

A means for rotating the first magnetic substance unit and the second magnetic substance unit is defined as including all means that can be used by those skilled in the art. Meanwhile, it can be more advantageous to give or control the chirality of the nanoparticles because a speed of the rotating means can be controlled.

The apparatus for forming the spiral magnetic field for manufacturing the chiral nano-structure provides an advantage of manufacturing a large amount of chiral nano-structures by the relatively simple method through the magnetic application and adjustment means, and has advantages of improving the process easiness and efficiency and furthermore, improving precision compared to the conventional method that uses the chemical synthesis method, uses the separate template, etc. In addition, it is possible to secure the immediate real-time property in the modulation of the additional chirality as necessary as well as in the case of initially giving chirality.

Hereinafter, specific examples of the present disclosure are presented. However, the examples described below are only for specifically exemplifying or explaining the present disclosure, and thus the scope of the present disclosure is not limitedly interpreted, and the scope of the present disclosure is determined by the claims.

MANUFACTURING EXAMPLE

Manufacturing Example 1: Synthesis of Spherical Core-Shell Nanoparticles (1)

A mixed solution was manufactured by mixing 3.2 mmol of iron nitrate ($Fe(NO_3)_3.9H_2O$) with 40 mL of ethylene glycol ($C_2H_4(OH)_2$) to stir the mixture with a magnetic stirrer until the mixture was completely dissolved. 35 mmol of sodium acetate ($CH_3COONa$) and 0.59 mmol of silver nitrate ($AgNO_3$) were put into the mixed solution, and stirring was continued. When sodium acetate and silver nitrate were all dissolved, the mixed solution was transferred to the Teflon container and put in the metal container to withstand the pressure and then heated at 210° C. and then kept for 4 hours. After the reaction was finished, the synthesized nanoparticles were separated by centrifugation, etc., and purified with ethanol and deionized water. The separated nanoparticles were dried in the vacuum oven for 12 hours and manufactured in the form of the powder.

Subsequently, in order to disperse the nanoparticles to the polar solvent such as deionized water, the surface pretreatment operation of attaching the hydrophilic functional group to the surface of the nanoparticles was performed. 1 mg of powder-formed nanoparticles manufactured in the nanoparticle synthesis operation and 0.6 mg of citric acid ($HOC(COOH)(CH_2COOH)_2$) were put into 1 mL of deionized water, sonicated for 2 hours, and then the nanoparticles were separated by centrifugation, etc. and purified with deionized water.

Manufacturing Example 2: Synthesis of Spherical Core-Shell Nanoparticles (2)

A mixed solution was manufactured by mixing 1.6 mmol of iron nitrate ($Fe(NO_3)_3.9H_2O$) with 40 mL of ethylene glycol ($C_2H_4(OH)_2$) to stir the mixture with a magnetic stirrer until the mixture was completely dissolved. 35 mmol of sodium acetate ($CH_3COONa$) and 0.59 mmol of silver nitrate ($AgNO_3$) were put into the mixed solution, and stirring was continued. When sodium acetate and silver nitrate were all dissolved, the mixed solution was transferred to the Teflon container and put in the metal container to withstand the pressure and then heated at 210° C. and then kept for 4 hours. After the reaction was finished, the synthesized nanoparticles were separated by centrifugation, etc., and purified with ethanol and deionized water. The separated nanoparticles were dried in the vacuum oven for 12 hours and manufactured in the form of the powder.

Subsequently, in order to disperse the nanoparticles to the polar solvent such as deionized water, the surface pretreatment operation of attaching the hydrophilic functional group to the surface of the nanoparticles was performed. 1 mg of powder-formed nanoparticles manufactured in the nanoparticle synthesis operation and 0.6 mg of citric acid ($HOC(COOH)(CH_2COOH)_2$) were put into 1 mL of deionized water, sonicated for 2 hours, and then the nanoparticles were separated by centrifugation, etc. and purified with deionized water.

Manufacturing Example 3: Synthesis of Rod-Shaped Core-Shell Nanoparticles

The mixed solution was manufactured by mixing 4.0 mmol of iron chloride ($FeCl_3.6H_2O$) with 40 mL of ethylene glycol ($C_2H_4(OH)_2$) to stir the mixture with the magnetic stirrer until the mixture was completely dissolved. 35 mmol of sodium acetate ($CH_3COONa$) and 0.59 mmol of chloroauric acid ($HAuCl_4.3H_2O$) were put into the mixed solution, and stirring was continued. When both sodium acetate and the chloroauric acid were dissolved, the mixed solution was transferred to the Teflon container, put into the metal container to withstand the pressure, and then heated at 200° C. and kept for 8 hours. After the reaction was finished, the synthesized nanoparticles were separated by centrifugation, etc., and purified with ethanol and deionized water. The separated nanoparticles were dried in the vacuum oven for 12 hours and manufactured in the form of the powder.

Subsequently, in order to disperse the nanoparticles to the polar solvent such as deionized water, the surface pretreatment operation of attaching the hydrophilic functional group to the surface of the nanoparticles was performed. 1 mg of powder-formed nanoparticles manufactured in the nanoparticle synthesis operation and 0.6 mg of citric acid ($HOC(COOH)(CH_2COOH)_2$) were put into 1 mL of deionized water, sonicated for 2 hours, and then the nanoparticles were separated by centrifugation, etc. and purified with deionized water.

Manufacturing Example 4: Synthesis of Spherical-Shaped Half-Shell Nanoparticles

The mixed solution was manufactured by mixing 0.12 M of iron chloride ($Fe(NO_3)_3.9H_2O$) and 34 mM of citric acid in 20 mL of ethylene glycol ($C_2H_4(OH)_2$) solution to stir the mixture with the magnetic stirrer until the mixture was completely dissolved. Sodium acetate ($CH_3COONa$) was added to the mixed solution to adjust the concentration to 0.73 M. When all sodium acetate was dissolved, the mixed solution was transferred to the Teflon container, put into the metal container to withstand the pressure, and then heated at 200° C. and kept for 10 hours. After the reaction was finished, the synthesized nanoparticles were separated by centrifugation, etc., and purified with ethanol and deionized water. The separated nanoparticles were dried in the vacuum oven for 12 hours and manufactured in the form of the powder.

Subsequently, in order to disperse the nanoparticles to the polar solvent such as deionized water, the surface pretreatment operation of attaching the hydrophilic functional group to the surface of the nanoparticles was performed. 1 mg of powder-formed nanoparticles manufactured in the nanoparticle synthesis operation and 0.6 mg of citric acid ($HOC(COOH)(CH_2COOH)_2$) were put into 1 mL of deionized water, sonicated for 2 hours, and then the nanoparticles were separated by centrifugation, etc. and purified with deionized water.

The slide glass was treated with the piranha solution to remove organic matter and foreign substances to manufacture the hydrophilic surface. The slide glass was immersed in 0.2 wt % polydialyldimethylammonium chloride (PDDA) polymer solution so that the positively charged PVA polymer could be evenly dispersed on the surface of the slide glass. Thereafter, the glass slide was taken out and dried and then the prepared magnetic nanoparticle solution was dropped so that the negatively charged nanoparticles could be uniformly attached to the positively charged PDDA surface, and the remaining solutions was slightly washed with deionized water and dried. The coating of about 20 nm was applied to the nanoparticles aligned on the slide glass as the single layer using the gold sputter. Thereafter, in order to stabilize the surface of the coated gold thin film, an excessive amount of cysteine with the concentration of 1 mg/mL was added and reacted for 12 hours at 60 rpm in the shaking incubator. After the reaction was finished, the nanoparticle single layer was separated from the slide glass by ultrasonic treatment, the nanoparticles were separated with the magnet and purified with deionized water.

EXAMPLE

Example 1: Chiral Nano-Structure Including Spherical Core-Shell Nanoparticles (1)

Spherical core-shell nanoparticles having the core containing silver (Ag) and the shell containing iron oxide ($Fe_3O_4$) were provided. The average diameter of the core was 61.4 (±13.3) nm, and the average thickness of the shell was 54.3 (±5.7) nm. Non-chiral nanoparticle dispersions were manufactured by dispersing the nanoparticles in the solvent of deionized water to have the respective concentrations as shown in Table 1 below. Two neodymium magnets (50×10×2 mm, 0.2 T) were provided, and as shown in FIG. 2, the two magnets were disposed to face each other at the interval of 3 cm in the same magnetization direction (y-axis direction). The non-chiral nanoparticle dispersion of each concentration was disposed in the middle of the two magnets, as shown in FIG. 4. The two magnets were rotated by the size of the same angle using the y-axis as the rotation axis, but one magnet was rotated clockwise and the other magnet was rotated counterclockwise. The two magnets were rotated so that the size of the angle between the long axis of each magnet and the z-axis, that is, the size of the rotation angle (θ) was the same as those shown in Table 1 below. Accordingly, the chiral nano-structure of Example 1 was manufactured.

TABLE 1

| | Concentration (B) [µg/mL] | θ [°] | τ relative ratio (C) (\|sin2θ\|) [θ = degree] | CD spectrum [mdeg] | | | (A*B*C)/Pmax (A = 61.4/54.3) |
|---|---|---|---|---|---|---|---|
| | | | | About @680 nm | About @830 nm | Pmax | |
| Example 1-1 | 25 | 0 | 0.00 | 24.0099 | −27.7944 | 27.7944 | 0.00 |
| Example 1-2 | 50 | 0 | 0.00 | −1.18151 | −3.35958 | 3.35958 | 0.00 |
| Example 1-3 | 75 | 0 | 0.00 | 67.0504 | −117.419 | 117.419 | 0.00 |
| Example 1-4 | 100 | 0 | 0.00 | 95.599 | −174.176 | 174.176 | 0.00 |
| Example 1-5 | 125 | 0 | 0.00 | 59.8761 | −168.584 | 168.584 | 0.00 |
| Example 1-6 | 150 | 0 | 0.00 | 62.7865 | −196.911 | 196.911 | 0.00 |
| Example 1-7 | 175 | 0 | 0.00 | 41.5222 | −158.031 | 158.031 | 0.00 |
| Example 1-8 | 200 | 0 | 0.00 | 24.2616 | −142.455 | 142.455 | 0.00 |
| Example 1-9 | 25 | 15 | 0.50 | −4.5823 | 14.4494 | 14.4494 | 0.98 |
| Example 1-10 | 50 | 15 | 0.50 | −85.6535 | 220.452 | 220.452 | 0.13 |
| Example 1-11 | 75 | 15 | 0.50 | −131.236 | 324.921 | 324.921 | 0.13 |
| Example 1-12 | 100 | 15 | 0.50 | −261.17 | 721.541 | 721.541 | 0.08 |
| Example 1-13 | 125 | 15 | 0.50 | −404.182 | 1147.69 | 1147.69 | 0.06 |
| Example 1-14 | 150 | 15 | 0.50 | −443.853 | 1276.1 | 1276.1 | 0.07 |
| Example 1-15 | 175 | 15 | 0.50 | −245.245 | 818.711 | 818.711 | 0.12 |
| Example 1-16 | 200 | 15 | 0.50 | −415.379 | 1174.39 | 1174.39 | 0.10 |
| Example 1-17 | 25 | 30 | 0.87 | −22.7185 | 79.474 | 79.474 | 0.31 |
| Example 1-18 | 50 | 30 | 0.87 | −121.04 | 417.616 | 417.616 | 0.12 |
| Example 1-19 | 75 | 30 | 0.87 | −272.214 | 646.457 | 646.457 | 0.11 |
| Example 1-20 | 100 | 30 | 0.87 | −490.672 | 1414.71 | 1414.71 | 0.07 |
| Example 1-21 | 125 | 30 | 0.87 | −678.063 | 2063.78 | 2063.78 | 0.06 |
| Example 1-22 | 150 | 30 | 0.87 | −634.406 | 1913.76 | 1913.76 | 0.08 |
| Example 1-23 | 175 | 30 | 0.87 | −825.094 | 2361.52 | 2361.52 | 0.07 |
| Example 1-24 | 200 | 30 | 0.87 | −755.049 | 2214.15 | 2214.15 | 0.09 |
| Example 1-25 | 25 | 45 | 1.00 | −20.9936 | 76.835 | 76.835 | 0.37 |
| Example 1-26 | 50 | 45 | 1.00 | −140.436 | 511.409 | 511.409 | 0.11 |

TABLE 1-continued

| | Concentration (B) [μg/mL] | θ [°] | τ relative ratio (C) (\|sin2θ\|) [θ = degree] | CD spectrum [mdeg] About @680 nm | About @830 nm | Pmax | (A*B*C)/Pmax (A = 61.4/54.3) |
|---|---|---|---|---|---|---|---|
| Example 1-27 | 75 | 45 | 1.00 | −306.815 | 1080.49 | 1080.49 | 0.08 |
| Example 1-28 | 100 | 45 | 1.00 | −591.983 | 1926.45 | 1926.45 | 0.06 |
| Example 1-29 | 125 | 45 | 1.00 | −742.859 | 2263.11 | 2263.11 | 0.06 |
| Example 1-30 | 150 | 45 | 1.00 | −722.538 | 2269.08 | 2269.08 | 0.07 |
| Example 1-31 | 175 | 45 | 1.00 | −941.641 | 2738.09 | 2738.09 | 0.07 |
| Example 1-32 | 200 | 45 | 1.00 | −1018.3 | 2892.83 | 2892.83 | 0.08 |
| Example 1-33 | 25 | 60 | 0.87 | −20.8995 | 73.6665 | 73.6665 | 0.33 |
| Example 1-34 | 50 | 60 | 0.87 | −88.4849 | 346.019 | 346.019 | 0.14 |
| Example 1-35 | 75 | 60 | 0.87 | −276.003 | 781.403 | 781.403 | 0.09 |
| Example 1-36 | 100 | 60 | 0.87 | −502.098 | 1540.75 | 1540.75 | 0.06 |
| Example 1-37 | 125 | 60 | 0.87 | −655.969 | 2052.61 | 2052.61 | 0.06 |
| Example 1-38 | 150 | 60 | 0.87 | −710.642 | 2167.07 | 2167.07 | 0.07 |
| Example 1-39 | 175 | 60 | 0.87 | −780.289 | 2379.01 | 2379.01 | 0.07 |
| Example 1-40 | 200 | 60 | 0.87 | −848.356 | 2460.57 | 2460.57 | 0.08 |
| Example 1-41 | 25 | 75 | 0.50 | −0.245546 | 24.6635 | 24.6635 | 0.57 |
| Example 1-42 | 50 | 75 | 0.50 | −36.2108 | 158.793 | 158.793 | 0.18 |
| Example 1-43 | 75 | 75 | 0.50 | −143.936 | 461.295 | 461.295 | 0.09 |
| Example 1-44 | 100 | 75 | 0.50 | −262.514 | 825.693 | 825.693 | 0.07 |
| Example 1-45 | 125 | 75 | 0.50 | −359.163 | 1140.66 | 1140.66 | 0.06 |
| Example 1-46 | 150 | 75 | 0.50 | −357.154 | 1284.65 | 1284.65 | 0.07 |
| Example 1-47 | 175 | 75 | 0.50 | −436.247 | 1330.04 | 1330.04 | 0.07 |
| Example 1-48 | 200 | 75 | 0.50 | −399.246 | 1214.5 | 1214.5 | 0.09 |
| Example 1-49 | 25 | 90 | 0.00 | 16.0777 | −44.0767 | 44.0767 | 0.00 |
| Example 1-50 | 50 | 90 | 0.00 | 28.9884 | −64.2371 | 64.2371 | 0.00 |
| Example 1-51 | 75 | 90 | 0.00 | 52.7822 | −126.687 | 126.687 | 0.00 |
| Example 1-52 | 100 | 90 | 0.00 | 60.1336 | −105.996 | 105.996 | 0.00 |
| Example 1-53 | 125 | 90 | 0.00 | 60.7256 | −132.183 | 132.183 | 0.00 |
| Example 1-54 | 150 | 90 | 0.00 | 44.4219 | −102.583 | 102.583 | 0.00 |
| Example 1-55 | 175 | 90 | 0.00 | 54.9442 | −120.422 | 120.422 | 0.00 |
| Example 1-56 | 200 | 90 | 0.00 | 28.7288 | −86.9 | 86.9 | 0.00 |
| Example 1-57 | 25 | 105 | 0.50 | 34.9145 | −105.617 | 105.617 | 0.13 |
| Example 1-58 | 50 | 105 | 0.50 | 74.5349 | −224.161 | 224.161 | 0.13 |
| Example 1-59 | 75 | 105 | 0.50 | 231.221 | −719.515 | 719.515 | 0.06 |
| Example 1-60 | 100 | 105 | 0.50 | 381.372 | −1127.94 | 1127.94 | 0.05 |
| Example 1-61 | 125 | 105 | 0.50 | 493.191 | −1466.55 | 1466.55 | 0.05 |
| Example 1-62 | 150 | 105 | 0.50 | 472.662 | −1430.01 | 1430.01 | 0.06 |
| Example 1-63 | 175 | 105 | 0.50 | 479.217 | −1467.72 | 1467.72 | 0.07 |

TABLE 1-continued

| | Concentration (B) [μg/mL] | θ [°] | τ relative ratio (C) (\|sin2θ\|) [θ = degree] | CD spectrum [mdeg] About @680 nm | CD spectrum [mdeg] About @830 nm | Pmax | (A*B*C)/Pmax (A = 61.4/54.3) |
|---|---|---|---|---|---|---|---|
| Example 1-64 | 200 | 105 | 0.50 | 440.318 | −1416.95 | 1416.95 | 0.08 |
| Example 1-65 | 25 | 120 | 0.87 | 44.0728 | −147.612 | 147.612 | 0.17 |
| Example 1-66 | 50 | 120 | 0.87 | 115.376 | −398.886 | 398.886 | 0.12 |
| Example 1-67 | 75 | 120 | 0.87 | 348.892 | −1100.23 | 1100.23 | 0.07 |
| Example 1-68 | 100 | 120 | 0.87 | 570.329 | −1844.23 | 1844.23 | 0.05 |
| Example 1-69 | 125 | 120 | 0.87 | 803.536 | −2343.33 | 2343.33 | 0.05 |
| Example 1-70 | 150 | 120 | 0.87 | 754.928 | −2261.11 | 2261.11 | 0.06 |
| Example 1-71 | 175 | 120 | 0.87 | 899.43 | −2568.77 | 2568.77 | 0.07 |
| Example 1-72 | 200 | 120 | 0.87 | 905.293 | −2470.57 | 2470.57 | 0.08 |
| Example 1-73 | 25 | 135 | 1.00 | 51.5963 | −186.348 | 186.348 | 0.15 |
| Example 1-74 | 50 | 135 | 1.00 | 165.941 | −582.582 | 582.582 | 0.10 |
| Example 1-75 | 75 | 135 | 1.00 | 414.199 | −1300.25 | 1300.25 | 0.07 |
| Example 1-76 | 100 | 135 | 1.00 | 680.842 | −2144.71 | 2144.71 | 0.05 |
| Example 1-77 | 125 | 135 | 1.00 | 805.463 | −2502.3 | 2502.3 | 0.06 |
| Example 1-78 | 150 | 135 | 1.00 | 882.054 | −2601.23 | 2601.23 | 0.07 |
| Example 1-79 | 175 | 135 | 1.00 | 1071.95 | −3049.28 | 3049.28 | 0.06 |
| Example 1-80 | 200 | 135 | 1.00 | 958.416 | −2714.1 | 2714.1 | 0.08 |
| Example 1-81 | 25 | 150 | 0.87 | 48.8084 | −159.532 | 159.532 | 0.15 |
| Example 1-82 | 50 | 150 | 0.87 | 154.376 | −515.826 | 515.826 | 0.09 |
| Example 1-83 | 75 | 150 | 0.87 | 375.085 | −1174.04 | 1174.04 | 0.06 |
| Example 1-84 | 100 | 150 | 0.87 | 599.926 | −1900.42 | 1900.42 | 0.05 |
| Example 1-85 | 125 | 150 | 0.87 | 757.317 | −2261.12 | 2261.12 | 0.05 |
| Example 1-86 | 150 | 150 | 0.87 | 719.947 | −2231.19 | 2231.19 | 0.07 |
| Example 1-87 | 175 | 150 | 0.87 | 1072.8 | −2985.31 | 2985.31 | 0.06 |
| Example 1-88 | 200 | 150 | 0.87 | 999.777 | −2777.72 | 2777.72 | 0.07 |
| Example 1-89 | 25 | 165 | 0.50 | 37.7221 | −117.342 | 117.342 | 0.12 |
| Example 1-90 | 50 | 165 | 0.50 | 96.7212 | −317.234 | 317.234 | 0.09 |
| Example 1-91 | 75 | 165 | 0.50 | 241.131 | −748.105 | 748.105 | 0.06 |
| Example 1-92 | 100 | 165 | 0.50 | 370.313 | −1163.1 | 1163.1 | 0.05 |
| Example 1-93 | 125 | 165 | 0.50 | 530.478 | −1494.5 | 1494.5 | 0.05 |
| Example 1-94 | 150 | 165 | 0.50 | 470.297 | −1417.91 | 1417.91 | 0.06 |
| Example 1-95 | 175 | 165 | 0.50 | 708.259 | −1794.61 | 1794.61 | 0.06 |
| Example 1-96 | 200 | 165 | 0.50 | 471.786 | −1363.09 | 1363.09 | 0.08 |
| Maximum value of (A*B*C)/Pmax | | | | | | | 0.98 |
| Minimum value of (A*B*C)/Pmax | | | | | | | 0.00 |
| For C > 0, minimum value of (A*B*C)/Pmax | | | | | | | 0.05 |

Example 2: Chiral Nano-Structure Including Spherical Core-Shell Nanoparticles (2)

Spherical core-shell nanoparticles having the core containing silver (Ag) and the shell containing iron oxide ($Fe_3O_4$) were provided. The average diameter of the core was 50.2 (±12.2) nm, and the average thickness of the shell was 56.3 (±7.4) nm. Non-chiral nanoparticle dispersion was manufactured by dispersing the nanoparticles in the solvent of deionized water to have the respective concentrations as shown in Table 2 below. Two neodymium magnets (50× 10×2 mm, 0.2 T) were provided, and as shown in FIG. 2, the two magnets were disposed to face each other at the interval of 3 cm in the same magnetization direction (y-axis direction). The non-chiral nanoparticle dispersion of each concentration was disposed in the middle of the two magnets, as shown in FIG. 4. The two magnets were rotated by the size of the same angle using the y-axis as the rotation axis, but one magnet was rotated clockwise and the other magnet was rotated counterclockwise. The two magnets were rotated so that the size of the angle between the long axis of each magnet and the z-axis, that is, the size of the rotation angle (θ) was the same as those shown in Table 2 below. Accordingly, the chiral nano-structure of Example 2 was manufactured.

TABLE 2

| | Concentration (B) [μg/mL] | θ [°] | τ relative ratio (C) (\|sin2θ\|) [θ = degree] | CD spectrum [mdeg] About @550 nm | About @630 nm | Pmax | (A*B*C)/Pmax (A = 50.2/56.3) |
|---|---|---|---|---|---|---|---|
| Example 2-1 | 25 | 0 | 0.00 | 12.9887 | −33.9227 | 33.9227 | 0.00 |
| Example 2-2 | 50 | 0 | 0.00 | 24.0005 | −69.5656 | 69.5656 | 0.00 |
| Example 2-3 | 75 | 0 | 0.00 | 37.3188 | −90.1883 | 90.1883 | 0.00 |
| Example 2-4 | 100 | 0 | 0.00 | 44.8066 | −147.669 | 147.669 | 0.00 |
| Example 2-5 | 125 | 0 | 0.00 | 69.7232 | −177.941 | 177.941 | 0.00 |
| Example 2-6 | 150 | 0 | 0.00 | 73.5675 | −232.129 | 232.129 | 0.00 |
| Example 2-7 | 175 | 0 | 0.00 | 56.4886 | −211.105 | 211.105 | 0.00 |
| Example 2-8 | 200 | 0 | 0.00 | 80.6551 | −195.476 | 195.476 | 0.00 |
| Example 2-9 | 25 | 15 | 0.50 | 2.04169 | 19.0562 | 19.0562 | 0.58 |
| Example 2-10 | 50 | 15 | 0.50 | −13.2609 | 133.278 | 133.278 | 0.17 |
| Example 2-11 | 75 | 15 | 0.50 | −41.9411 | 319.499 | 319.499 | 0.10 |
| Example 2-12 | 100 | 15 | 0.50 | −71.6352 | 545.872 | 545.872 | 0.08 |
| Example 2-13 | 125 | 15 | 0.50 | −115.016 | 751.164 | 751.164 | 0.07 |
| Example 2-14 | 150 | 15 | 0.50 | −169.939 | 982.81 | 982.81 | 0.07 |
| Example 2-15 | 175 | 15 | 0.50 | −252.55 | 1177.08 | 1177.08 | 0.07 |
| Example 2-16 | 200 | 15 | 0.50 | −286.668 | 1196.82 | 1196.82 | 0.07 |
| Example 2-17 | 25 | 30 | 0.87 | −4.94052 | 55.0064 | 55.0064 | 0.35 |
| Example 2-18 | 50 | 30 | 0.87 | −21.8273 | 221.683 | 221.683 | 0.17 |
| Example 2-19 | 75 | 30 | 0.87 | −66.9534 | 527.974 | 527.974 | 0.11 |
| Example 2-20 | 100 | 30 | 0.87 | −140.085 | 898.497 | 898.497 | 0.09 |
| Example 2-21 | 125 | 30 | 0.87 | −201.536 | 1187.15 | 1187.15 | 0.08 |
| Example 2-22 | 150 | 30 | 0.87 | −285.584 | 1619.41 | 1619.41 | 0.07 |
| Example 2-23 | 175 | 30 | 0.87 | −433.604 | 2225.84 | 2225.84 | 0.06 |
| Example 2-24 | 200 | 30 | 0.87 | −486.3 | 2106.9 | 2106.9 | 0.07 |
| Example 2-25 | 25 | 45 | 1.00 | −0.08542 | 55.9676 | 55.9676 | 0.40 |
| Example 2-26 | 50 | 45 | 1.00 | −21.1961 | 212.854 | 212.854 | 0.21 |
| Example 2-27 | 75 | 45 | 1.00 | −74.4058 | 589.566 | 589.566 | 0.11 |
| Example 2-28 | 100 | 45 | 1.00 | −155.121 | 1046.21 | 1046.21 | 0.09 |

TABLE 2-continued

| | Concentration (B) [μg/mL] | θ [°] | τ relative ratio (C) (\|sin2θ\|) [θ = degree] | CD spectrum [mdeg] About @550 nm | About @630 nm | Pmax | (A*B*C)/Pmax (A = 50.2/56.3) |
|---|---|---|---|---|---|---|---|
| Example 2-29 | 125 | 45 | 1.00 | −210.311 | 1297.41 | 1297.41 | 0.09 |
| Example 2-30 | 150 | 45 | 1.00 | −345.387 | 1916.35 | 1916.35 | 0.07 |
| Example 2-31 | 175 | 45 | 1.00 | −497.619 | 2605.74 | 2605.74 | 0.06 |
| Example 2-32 | 200 | 45 | 1.00 | −605.706 | 2554.89 | 2554.89 | 0.07 |
| Example 2-33 | 25 | 60 | 0.87 | 0.161611 | 46.2883 | 46.2883 | 0.42 |
| Example 2-34 | 50 | 60 | 0.87 | −14.1837 | 166.475 | 166.475 | 0.23 |
| Example 2-35 | 75 | 60 | 0.87 | −53.0223 | 451.453 | 451.453 | 0.13 |
| Example 2-36 | 100 | 60 | 0.87 | −108.765 | 793.788 | 793.788 | 0.10 |
| Example 2-37 | 125 | 60 | 0.87 | −149.601 | 967.583 | 967.583 | 0.10 |
| Example 2-38 | 150 | 60 | 0.87 | −270.391 | 1566.68 | 1566.68 | 0.07 |
| Example 2-39 | 175 | 60 | 0.87 | −384.997 | 1989.45 | 1989.45 | 0.07 |
| Example 2-40 | 200 | 60 | 0.87 | −505.936 | 2198.12 | 2198.12 | 0.07 |
| Example 2-41 | 25 | 75 | 0.50 | 2.59645 | 15.2231 | 15.2231 | 0.73 |
| Example 2-42 | 50 | 75 | 0.50 | −0.765858 | 83.6581 | 83.6581 | 0.27 |
| Example 2-43 | 75 | 75 | 0.50 | −20.7056 | 211.067 | 211.067 | 0.16 |
| Example 2-44 | 100 | 75 | 0.50 | −46.9466 | 413.847 | 413.847 | 0.11 |
| Example 2-45 | 125 | 75 | 0.50 | −61.347 | 427.492 | 427.492 | 0.13 |
| Example 2-46 | 150 | 75 | 0.50 | −146.882 | 838.844 | 838.844 | 0.08 |
| Example 2-47 | 175 | 75 | 0.50 | −183.78 | 916.749 | 916.749 | 0.08 |
| Example 2-48 | 200 | 75 | 0.50 | −256.047 | 1226.8 | 1226.8 | 0.07 |
| Example 2-49 | 25 | 90 | 0.00 | 9.84896 | −18.8676 | 18.8676 | 0.00 |
| Example 2-50 | 50 | 90 | 0.00 | 15.4456 | −28.7567 | 28.7567 | 0.00 |
| Example 2-51 | 75 | 90 | 0.00 | 23.4234 | −56.0573 | 56.0573 | 0.00 |
| Example 2-52 | 100 | 90 | 0.00 | 26.461 | −54.7599 | 54.7599 | 0.00 |
| Example 2-53 | 125 | 90 | 0.00 | 33.0412 | −52.6661 | 52.6661 | 0.00 |
| Example 2-54 | 150 | 90 | 0.00 | 41.7176 | −77.1626 | 77.1626 | 0.00 |
| Example 2-55 | 175 | 90 | 0.00 | 34.1409 | −58.5267 | 58.5267 | 0.00 |
| Example 2-56 | 200 | 90 | 0.00 | 55.8616 | −71.8682 | 71.8682 | 0.00 |
| Example 2-57 | 25 | 105 | 0.50 | 12.1705 | −45.612 | 45.612 | 0.24 |
| Example 2-58 | 50 | 105 | 0.50 | 27.4317 | −107.644 | 107.644 | 0.21 |
| Example 2-59 | 75 | 105 | 0.50 | 58.5299 | −267.077 | 267.077 | 0.12 |
| Example 2-60 | 100 | 105 | 0.50 | 94.0003 | −458.404 | 458.404 | 0.10 |
| Example 2-61 | 125 | 105 | 0.50 | 103.088 | −503.227 | 503.227 | 0.11 |
| Example 2-62 | 150 | 105 | 0.50 | 194.818 | −833.629 | 833.629 | 0.08 |
| Example 2-63 | 175 | 105 | 0.50 | 241.432 | −981.791 | 981.791 | 0.08 |
| Example 2-64 | 200 | 105 | 0.50 | 350.582 | −1289.48 | 1289.48 | 0.07 |
| Example 2-65 | 25 | 120 | 0.87 | 10.1605 | −57.3501 | 57.3501 | 0.34 |

TABLE 2-continued

| | Concentration (B) [μg/mL] | θ [°] | τ relative ratio (C) (\|sin2θ\|) [θ = degree] | CD spectrum [mdeg] About @550 nm | CD spectrum [mdeg] About @630 nm | Pmax | (A*B*C)/Pmax (A = 50.2/56.3) |
|---|---|---|---|---|---|---|---|
| Example 2-66 | 50 | 120 | 0.87 | 29.1265 | −136.643 | 136.643 | 0.28 |
| Example 2-67 | 75 | 120 | 0.87 | 74.073 | −357.38 | 357.38 | 0.16 |
| Example 2-68 | 100 | 120 | 0.87 | 133.365 | −661.947 | 661.947 | 0.12 |
| Example 2-69 | 125 | 120 | 0.87 | 136.452 | −655.09 | 655.09 | 0.15 |
| Example 2-70 | 150 | 120 | 0.87 | 297.667 | −1342.15 | 1342.15 | 0.09 |
| Example 2-71 | 175 | 120 | 0.87 | 351.385 | −1529.56 | 1529.56 | 0.09 |
| Example 2-72 | 200 | 120 | 0.87 | 486.754 | −1796 | 1796 | 0.09 |
| Example 2-73 | 25 | 135 | 1.00 | 12.016 | −51.161 | 51.161 | 0.43 |
| Example 2-74 | 50 | 135 | 1.00 | 30.7176 | −136.684 | 136.684 | 0.33 |
| Example 2-75 | 75 | 135 | 1.00 | 74.6721 | −368.175 | 368.175 | 0.18 |
| Example 2-76 | 100 | 135 | 1.00 | 142.527 | −695.904 | 695.904 | 0.13 |
| Example 2-77 | 125 | 135 | 1.00 | 233.812 | −1073.28 | 1073.28 | 0.10 |
| Example 2-78 | 150 | 135 | 1.00 | 309.784 | −1423.48 | 1423.48 | 0.09 |
| Example 2-79 | 175 | 135 | 1.00 | 403.784 | −1806.37 | 1806.37 | 0.09 |
| Example 2-80 | 200 | 135 | 1.00 | 545.072 | −1995.66 | 1995.66 | 0.09 |
| Example 2-81 | 25 | 150 | 0.87 | 9.68342 | −46.9737 | 46.9737 | 0.41 |
| Example 2-82 | 50 | 150 | 0.87 | 26.3462 | −110.558 | 110.558 | 0.35 |
| Example 2-83 | 75 | 150 | 0.87 | 63.2917 | −275.067 | 275.067 | 0.21 |
| Example 2-84 | 100 | 150 | 0.87 | 121.576 | −502.891 | 502.891 | 0.15 |
| Example 2-85 | 125 | 150 | 0.87 | 175.334 | −793.066 | 793.066 | 0.12 |
| Example 2-86 | 150 | 150 | 0.87 | 274.307 | −1201.31 | 1201.31 | 0.10 |
| Example 2-87 | 175 | 150 | 0.87 | 371.011 | −1444.21 | 1444.21 | 0.09 |
| Example 2-88 | 200 | 150 | 0.87 | 433.043 | −1554.62 | 1554.62 | 0.10 |
| Example 2-89 | 25 | 165 | 0.50 | 9.81558 | −33.4495 | 33.4495 | 0.33 |
| Example 2-90 | 50 | 165 | 0.50 | 17.268 | −66.056 | 66.056 | 0.34 |
| Example 2-91 | 75 | 165 | 0.50 | 34.6347 | −153.61 | 153.61 | 0.22 |
| Example 2-92 | 100 | 165 | 0.50 | 64.7832 | −273.244 | 273.244 | 0.16 |
| Example 2-93 | 125 | 165 | 0.50 | 125.247 | −509.581 | 509.581 | 0.11 |
| Example 2-94 | 150 | 165 | 0.50 | 171.555 | −721.413 | 721.413 | 0.09 |
| Example 2-95 | 175 | 165 | 0.50 | 228.764 | −870.148 | 870.148 | 0.09 |
| Example 2-96 | 200 | 165 | 0.50 | 268.001 | −915.525 | 915.525 | 0.10 |
| Maximum value of (A*B*C)/Pmax | | | | | | | 0.73 |
| Minimum value of (A*B*C)/Pmax | | | | | | | 0.00 |
| For C > 0, minimum value of (A*B*C)/Pmax | | | | | | | 0.06 |

Example 3: Chiral Nano-Structure Including Rod-Shaped Core-Shell Nanoparticles Rod-shaped core-shell nanoparticles having the core containing gold (Au) and the shell containing iron oxide ($Fe_3O_4$) were provided. The average length of the core was 2454 (±624) nm, the average width of the core was 78 (±16) nm, and the average thickness of the shell was 107 (±12) nm. Non-chiral nanoparticle dispersions were manufactured by dispersing the nanoparticles in the solvent of deionized water to have the respective concentrations as shown in Table 3 below. Two neodymium magnets (50×10×2 mm, 0.2

T) were provided, and as shown in FIG. 2, the two magnets were disposed to face each other at the interval of 3 cm in the same magnetization direction (y-axis direction). The non-chiral nanoparticle dispersion of each concentration was disposed in the middle of the two magnets, as shown in FIG. 4. The two magnets were rotated by the size of the same angle using the y-axis as the rotation axis, but one magnet was rotated clockwise and the other magnet was rotated counterclockwise. The two magnets were rotated so that the size of the angle between the long axis of each magnet and the z-axis, that is, the size of the rotation angle (θ) was the same as those shown in Table 3 below. Accordingly, the chiral nano-structure of Example 3 was manufactured.

TABLE 3

| | Concentration (B) [μg/mL] | θ [°] | τ relative ratio (C) (\|sin2θ\|) [θ = degree] | CD spectrum [mdeg] | | | (A*B*C)/Pmax (A = 78/107) |
|---|---|---|---|---|---|---|---|
| | | | | About @560 nm | About @830 nm | Pmax | |
| Example 3-1 | 25 | 0 | 0.00 | −7.53815 | 9.50373 | 9.50373 | 0.00 |
| Example 3-2 | 50 | 0 | 0.00 | −11.5166 | 11.6856 | 11.6856 | 0.00 |
| Example 3-3 | 75 | 0 | 0.00 | −19.4045 | 13.333 | 19.4045 | 0.00 |
| Example 3-4 | 100 | 0 | 0.00 | −30.2261 | 13.0284 | 30.2261 | 0.00 |
| Example 3-5 | 125 | 0 | 0.00 | −27.3712 | 29.2251 | 29.2251 | 0.00 |
| Example 3-6 | 150 | 0 | 0.00 | −22.7016 | 38.9029 | 38.9029 | 0.00 |
| Example 3-7 | 175 | 0 | 0.00 | −19.079 | 34.1915 | 34.1915 | 0.00 |
| Example 3-8 | 200 | 0 | 0.00 | −26.3219 | 35.9554 | 35.9554 | 0.00 |
| Example 3-9 | 25 | 15 | 0.50 | −7.91551 | 7.68037 | 7.91551 | 1.15 |
| Example 3-10 | 50 | 15 | 0.50 | −15.8674 | −6.02037 | 15.8674 | 1.15 |
| Example 3-11 | 75 | 15 | 0.50 | −27.9142 | −19.1392 | 27.9142 | 0.98 |
| Example 3-12 | 100 | 15 | 0.50 | −39.4368 | −32.1212 | 39.4368 | 0.93 |
| Example 3-13 | 125 | 15 | 0.50 | −51.6815 | −47.6679 | 51.6815 | 0.88 |
| Example 3-14 | 150 | 15 | 0.50 | −57.5326 | −65.4931 | 65.4931 | 0.84 |
| Example 3-15 | 175 | 15 | 0.50 | −70.7813 | −100.152 | 100.152 | 0.64 |
| Example 3-16 | 200 | 15 | 0.50 | −65.7547 | −115.026 | 115.026 | 0.63 |
| Example 3-17 | 25 | 30 | 0.87 | −9.4047 | 0.259422 | 9.4047 | 1.68 |
| Example 3-18 | 50 | 30 | 0.87 | −20.5545 | −14.4674 | 20.5545 | 1.54 |
| Example 3-19 | 75 | 30 | 0.87 | −35.1782 | −35.3682 | 35.3682 | 1.34 |
| Example 3-20 | 100 | 30 | 0.87 | −54.9278 | −64.9022 | 64.9022 | 0.97 |
| Example 3-21 | 125 | 30 | 0.87 | −70.683 | −103.213 | 103.213 | 0.77 |
| Example 3-22 | 150 | 30 | 0.87 | −80.7226 | −139.911 | 139.911 | 0.68 |
| Example 3-23 | 175 | 30 | 0.87 | −84.4237 | −184.024 | 184.024 | 0.60 |
| Example 3-24 | 200 | 30 | 0.87 | −105.777 | −236.778 | 236.778 | 0.53 |
| Example 3-25 | 25 | 45 | 1.00 | −8.93725 | 1.29636 | 8.93725 | 2.04 |
| Example 3-26 | 50 | 45 | 1.00 | −23.0299 | −13.2333 | 23.0299 | 1.58 |
| Example 3-27 | 75 | 45 | 1.00 | −37.3763 | −40.461 | 40.461 | 1.35 |
| Example 3-28 | 100 | 45 | 1.00 | −59.3599 | −80.2965 | 80.2965 | 0.91 |
| Example 3-29 | 125 | 45 | 1.00 | −74.4613 | −114.102 | 114.102 | 0.80 |
| Example 3-30 | 150 | 45 | 1.00 | −93.3701 | −167.345 | 167.345 | 0.65 |
| Example 3-31 | 175 | 45 | 1.00 | −93.1886 | −216.908 | 216.908 | 0.59 |
| Example 3-32 | 200 | 45 | 1.00 | −109.779 | −263.285 | 263.285 | 0.55 |

TABLE 3-continued

| | Concentration (B) [μg/mL] | θ [°] | τ relative ratio (C) (\|sin2θ\|) [θ = degree] | CD spectrum [mdeg] About @560 nm | CD spectrum [mdeg] About @830 nm | Pmax | (A*B*C)/Pmax (A = 78/107) |
|---|---|---|---|---|---|---|---|
| Example 3-33 | 25 | 60 | 0.87 | −6.4495 | 2.78366 | 6.4495 | 2.45 |
| Example 3-34 | 50 | 60 | 0.87 | −14.6077 | −12.3136 | 14.6077 | 2.16 |
| Example 3-35 | 75 | 60 | 0.87 | −29.8128 | −33.7258 | 33.7258 | 1.41 |
| Example 3-36 | 100 | 60 | 0.87 | −49.5093 | −60.2401 | 60.2401 | 1.05 |
| Example 3-37 | 125 | 60 | 0.87 | −63.1746 | −96.4258 | 96.4258 | 0.82 |
| Example 3-38 | 150 | 60 | 0.87 | −82.6834 | −146.269 | 146.269 | 0.65 |
| Example 3-39 | 175 | 60 | 0.87 | −76.156 | −176.352 | 176.352 | 0.63 |
| Example 3-40 | 200 | 60 | 0.87 | −74.7141 | −206.697 | 206.697 | 0.61 |
| Example 3-41 | 25 | 75 | 0.50 | −6.55073 | 5.32714 | 6.55073 | 1.39 |
| Example 3-42 | 50 | 75 | 0.50 | −18.8469 | −5.32564 | 18.8469 | 0.97 |
| Example 3-43 | 75 | 75 | 0.50 | −21.2838 | −15.4706 | 21.2838 | 1.29 |
| Example 3-44 | 100 | 75 | 0.50 | −33.7699 | −28.8007 | 33.7699 | 1.08 |
| Example 3-45 | 125 | 75 | 0.50 | −36.9541 | −46.3082 | 46.3082 | 0.99 |
| Example 3-46 | 150 | 75 | 0.50 | −48.4698 | −71.9071 | 71.9071 | 0.76 |
| Example 3-47 | 175 | 75 | 0.50 | −54.8074 | −93.9875 | 93.9875 | 0.68 |
| Example 3-48 | 200 | 75 | 0.50 | −60.9551 | −114.5 | 114.5 | 0.64 |
| Example 3-49 | 25 | 90 | 0.00 | −8.21705 | 5.6958 | 8.21705 | 0.00 |
| Example 3-50 | 50 | 90 | 0.00 | −14.5284 | 4.16412 | 14.5284 | 0.00 |
| Example 3-51 | 75 | 90 | 0.00 | −19.2898 | 4.08091 | 19.2898 | 0.00 |
| Example 3-52 | 100 | 90 | 0.00 | −18.027 | 12.6545 | 18.027 | 0.00 |
| Example 3-53 | 125 | 90 | 0.00 | −21.2254 | 24.8205 | 24.8205 | 0.00 |
| Example 3-54 | 150 | 90 | 0.00 | −15.3822 | 22.9 | 22.9 | 0.00 |
| Example 3-55 | 175 | 90 | 0.00 | −24.9115 | 20.5429 | 24.9115 | 0.00 |
| Example 3-56 | 200 | 90 | 0.00 | −23.7274 | 23.832 | 23.832 | 0.00 |
| Example 3-57 | 25 | 105 | 0.50 | −2.01906 | 8.26742 | 8.26742 | 1.10 |
| Example 3-58 | 50 | 105 | 0.50 | −4.33768 | 14.8651 | 14.8651 | 1.23 |
| Example 3-59 | 75 | 105 | 0.50 | −9.37984 | 28.0946 | 28.0946 | 0.97 |
| Example 3-60 | 100 | 105 | 0.50 | −10.9829 | 52.7525 | 52.7525 | 0.69 |
| Example 3-61 | 125 | 105 | 0.50 | −5.55637 | 77.838 | 77.838 | 0.59 |
| Example 3-62 | 150 | 105 | 0.50 | 2.34774 | 108.448 | 108.448 | 0.50 |
| Example 3-63 | 175 | 105 | 0.50 | −3.44082 | 129.594 | 129.594 | 0.49 |
| Example 3-64 | 200 | 105 | 0.50 | −1.00455 | 149.064 | 149.064 | 0.49 |
| Example 3-65 | 25 | 120 | 0.87 | −6.74832 | 8.49235 | 8.49235 | 1.86 |
| Example 3-66 | 50 | 120 | 0.87 | −3.26899 | 19.614 | 19.614 | 1.61 |
| Example 3-67 | 75 | 120 | 0.87 | −1.63751 | 42.1399 | 42.1399 | 1.13 |
| Example 3-68 | 100 | 120 | 0.87 | 8.42136 | 87.5046 | 87.5046 | 0.72 |
| Example 3-69 | 125 | 120 | 0.87 | 17.7691 | 125.622 | 125.622 | 0.63 |

TABLE 3-continued

| | Concentration (B) [μg/mL] | θ [°] | τ relative ratio (C) (\|sin2θ\|) [θ = degree] | CD spectrum [mdeg] About @560 nm | CD spectrum [mdeg] About @830 nm | Pmax | (A*B*C)/Pmax (A = 78/107) |
|---|---|---|---|---|---|---|---|
| Example 3-70 | 150 | 120 | 0.87 | 29.9982 | 180.58 | 180.58 | 0.53 |
| Example 3-71 | 175 | 120 | 0.87 | 18.6498 | 204.748 | 204.748 | 0.54 |
| Example 3-72 | 200 | 120 | 0.87 | 42.3768 | 244.464 | 244.464 | 0.52 |
| Example 3-73 | 25 | 135 | 1.00 | −4.69228 | 8.02431 | 8.02431 | 2.27 |
| Example 3-74 | 50 | 135 | 1.00 | −7.01615 | 15.3894 | 15.3894 | 2.37 |
| Example 3-75 | 75 | 135 | 1.00 | 1.10383 | 51.6208 | 51.6208 | 1.06 |
| Example 3-76 | 100 | 135 | 1.00 | 9.99771 | 90.5506 | 90.5506 | 0.81 |
| Example 3-77 | 125 | 135 | 1.00 | 19.9972 | 135.318 | 135.318 | 0.67 |
| Example 3-78 | 150 | 135 | 1.00 | 26.0874 | 195.643 | 195.643 | 0.56 |
| Example 3-79 | 175 | 135 | 1.00 | 39.5219 | 234.553 | 234.553 | 0.54 |
| Example 3-80 | 200 | 135 | 1.00 | 38.8694 | 293.858 | 293.858 | 0.50 |
| Example 3-81 | 25 | 150 | 0.87 | −6.71394 | 6.86092 | 6.86092 | 2.30 |
| Example 3-82 | 50 | 150 | 0.87 | −4.00949 | 12.8799 | 12.8799 | 2.45 |
| Example 3-83 | 75 | 150 | 0.87 | −2.05087 | 42.0491 | 42.0491 | 1.13 |
| Example 3-84 | 100 | 150 | 0.87 | 2.5425 | 78.2846 | 78.2846 | 0.81 |
| Example 3-85 | 125 | 150 | 0.87 | 17.0064 | 134.022 | 134.022 | 0.59 |
| Example 3-86 | 150 | 150 | 0.87 | 15.4648 | 176.807 | 176.807 | 0.54 |
| Example 3-87 | 175 | 150 | 0.87 | 39.1618 | 219.53 | 219.53 | 0.50 |
| Example 3-88 | 200 | 150 | 0.87 | 35.0033 | 270.308 | 270.308 | 0.47 |
| Example 3-89 | 25 | 165 | 0.50 | −2.72344 | 3.83548 | 3.83548 | 2.38 |
| Example 3-90 | 50 | 165 | 0.50 | −6.24092 | 6.95336 | 6.95336 | 2.62 |
| Example 3-91 | 75 | 165 | 0.50 | −0.576269 | 24.7738 | 24.7738 | 1.10 |
| Example 3-92 | 100 | 165 | 0.50 | −6.19691 | 59.9633 | 59.9633 | 0.61 |
| Example 3-93 | 125 | 165 | 0.50 | 2.06396 | 91.3203 | 91.3203 | 0.50 |
| Example 3-94 | 150 | 165 | 0.50 | 9.68981 | 99.0606 | 99.0606 | 0.55 |
| Example 3-95 | 175 | 165 | 0.50 | 7.16727 | 136.52 | 136.52 | 0.47 |
| Example 3-96 | 200 | 165 | 0.50 | 8.96223 | 157.629 | 157.629 | 0.46 |
| Maximum value of (A*B*C)/Pmax | | | | | | | 2.62 |
| Minimum value of (A*B*C)/Pmax | | | | | | | 0.00 |
| For C > 0, minimum value of (A*B*C)/Pmax | | | | | | | 0.46 |

Example 4: Chiral Nano-Structure Including Rod-Shaped Half-Shell Nanoparticles Spherical half-shell nanoparticles having the core containing iron oxide ($Fe_3O_4$) and the shell containing gold (Au) but including the half-shell were provided. The average diameter of the core was 204.6 (±23.6) nm, and the average thickness of the shell was 22.8 (±1.8) nm. Non-chiral nanoparticle dispersion was manufactured by dispersing the nanoparticles in the solvent of deionized water to have the respective concentrations as shown in Table 4 below. Two neodymium magnets (50×10×2 mm, 0.2 T) were provided, and as shown in FIG. 2, the two magnets were disposed to face each other at the interval of 3 cm in the same magnetization direction (y-axis direction). The non-chiral nanoparticle dispersion of each concentration was disposed in the middle of the two magnets, as shown in FIG. 4. The two magnets were rotated by the size of the same angle using the y-axis as the rotation axis, but one magnet was rotated clockwise and the other magnet was rotated counterclockwise. The two magnets were rotated so that the size of the angle between the long axis of each magnet and the z-axis, that is, the size of the rotation angle (θ) was the same as those shown in Table 4 below. Accordingly, the chiral nano-structure of Example 4 was manufactured.

TABLE 4

| | Concentration (B) [μg/mL] | θ [°] | τ relative ratio (C) (\|sin2θ\|) [θ = degree] | CD spectrum [mdeg] About @450 nm | CD spectrum [mdeg] About @700 nm | Pmax | (A*B*C)/Pmax (A = 204.6/22.8) |
|---|---|---|---|---|---|---|---|
| Example 4-1 | 25 | 0 | 0.00 | −13.7293 | −9.37537 | 13.7293 | 0.00 |
| Example 4-2 | 50 | 0 | 0.00 | −26.8003 | −19.6424 | 26.8003 | 0.00 |
| Example 4-3 | 75 | 0 | 0.00 | −40.3599 | −27.4027 | 40.3599 | 0.00 |
| Example 4-4 | 100 | 0 | 0.00 | −61.3673 | −49.9827 | 61.3673 | 0.00 |
| Example 4-5 | 125 | 0 | 0.00 | −64.7302 | −63.3074 | 64.7302 | 0.00 |
| Example 4-6 | 150 | 0 | 0.00 | −82.6592 | −71.9333 | 82.6592 | 0.00 |
| Example 4-7 | 175 | 0 | 0.00 | −78.9345 | −97.0621 | 97.0621 | 0.00 |
| Example 4-8 | 200 | 0 | 0.00 | −82.7787 | −80.4553 | 82.7787 | 0.00 |
| Example 4-9 | 25 | 15 | 0.50 | −11.437 | −6.12388 | 11.437 | 9.80 |
| Example 4-10 | 50 | 15 | 0.50 | −0.387778 | −28.7961 | 28.7961 | 7.79 |
| Example 4-11 | 75 | 15 | 0.50 | 8.87803 | −38.657 | 38.657 | 8.70 |
| Example 4-12 | 100 | 15 | 0.50 | 14.8943 | −64.7364 | 64.7364 | 6.93 |
| Example 4-13 | 125 | 15 | 0.50 | 27.2106 | −113.701 | 113.701 | 4.93 |
| Example 4-14 | 150 | 15 | 0.50 | 32.7927 | −126.945 | 126.945 | 5.30 |
| Example 4-15 | 175 | 15 | 0.50 | 41.7736 | −163.453 | 163.453 | 4.80 |
| Example 4-16 | 200 | 15 | 0.50 | 81.4048 | −197.244 | 197.244 | 4.55 |
| Example 4-17 | 25 | 30 | 0.87 | −11.437 | −6.12388 | 11.437 | 16.98 |
| Example 4-18 | 50 | 30 | 0.87 | 9.05278 | −30.7624 | 30.7624 | 12.63 |
| Example 4-19 | 75 | 30 | 0.87 | 39.1174 | −56.1303 | 56.1303 | 10.38 |
| Example 4-20 | 100 | 30 | 0.87 | 79.4493 | −82.8562 | 82.8562 | 9.38 |
| Example 4-21 | 125 | 30 | 0.87 | 97.5773 | −137.605 | 137.605 | 7.06 |
| Example 4-22 | 150 | 30 | 0.87 | 129.521 | −176.785 | 176.785 | 6.59 |
| Example 4-23 | 175 | 30 | 0.87 | 173.356 | −212.988 | 212.988 | 6.38 |
| Example 4-24 | 200 | 30 | 0.87 | 179.851 | −248.184 | 248.184 | 6.26 |
| Example 4-25 | 25 | 45 | 1.00 | −3.60336 | −13.2538 | 13.2538 | 16.92 |
| Example 4-26 | 50 | 45 | 1.00 | 20.658 | −37.4083 | 37.4083 | 11.99 |
| Example 4-27 | 75 | 45 | 1.00 | 50.3629 | −60.2882 | 60.2882 | 11.16 |
| Example 4-28 | 100 | 45 | 1.00 | 88.9416 | −95.797 | 95.797 | 9.36 |
| Example 4-29 | 125 | 45 | 1.00 | 127.573 | −159.375 | 159.375 | 7.04 |
| Example 4-30 | 150 | 45 | 1.00 | 148.764 | −202.892 | 202.892 | 6.63 |
| Example 4-31 | 175 | 45 | 1.00 | 164.48 | −244.317 | 244.317 | 6.43 |
| Example 4-32 | 200 | 45 | 1.00 | 177.76 | −275.326 | 275.326 | 6.52 |
| Example 4-33 | 25 | 60 | 0.87 | −8.39113 | −13.7004 | 13.7004 | 14.18 |
| Example 4-34 | 50 | 60 | 0.87 | 12.5795 | −38.8445 | 38.8445 | 10.00 |
| Example 4-35 | 75 | 60 | 0.87 | 46.6445 | −54.6695 | 54.6695 | 10.66 |
| Example 4-36 | 100 | 60 | 0.87 | 78.3133 | −98.3385 | 98.3385 | 7.90 |
| Example 4-37 | 125 | 60 | 0.87 | 100.229 | −136.854 | 136.854 | 7.10 |

TABLE 4-continued

|  | Concentration (B) [μg/mL] | θ [°] | τ relative ratio (C) (\|sin2θ\|) [θ = degree] | CD spectrum [mdeg] About @450 nm | About @700 nm | Pmax | (A*B*C)/Pmax (A = 204.6/22.8) |
|---|---|---|---|---|---|---|---|
| Example 4-38 | 150 | 60 | 0.87 | 136 | −196.026 | 196.026 | 5.94 |
| Example 4-39 | 175 | 60 | 0.87 | 152.98 | −239.44 | 239.44 | 5.68 |
| Example 4-40 | 200 | 60 | 0.87 | 174.774 | −258.659 | 258.659 | 6.01 |
| Example 4-41 | 25 | 75 | 0.50 | −13.1136 | −11.9487 | 13.1136 | 8.55 |
| Example 4-42 | 50 | 75 | 0.50 | −2.90439 | −25.3031 | 25.3031 | 8.86 |
| Example 4-43 | 75 | 75 | 0.50 | 14.0841 | −46.955 | 46.955 | 7.16 |
| Example 4-44 | 100 | 75 | 0.50 | 25.5531 | −65.2249 | 65.2249 | 6.88 |
| Example 4-45 | 125 | 75 | 0.50 | 32.7731 | −110.369 | 110.369 | 5.08 |
| Example 4-46 | 150 | 75 | 0.50 | 38.7656 | −150.619 | 150.619 | 4.47 |
| Example 4-47 | 175 | 75 | 0.50 | 68.8032 | −167.151 | 167.151 | 4.70 |
| Example 4-48 | 200 | 75 | 0.50 | 80.1045 | −181.408 | 181.408 | 4.94 |
| Example 4-49 | 25 | 90 | 0.00 | −13.6779 | −11.4838 | 13.6779 | 0.00 |
| Example 4-50 | 50 | 90 | 0.00 | −31.6212 | −20.6161 | 31.6212 | 0.00 |
| Example 4-51 | 75 | 90 | 0.00 | −41.8544 | −23.6395 | 41.8544 | 0.00 |
| Example 4-52 | 100 | 90 | 0.00 | −41.9537 | −31.529 | 41.9537 | 0.00 |
| Example 4-53 | 125 | 90 | 0.00 | −89.1371 | −56.5824 | 89.1371 | 0.00 |
| Example 4-54 | 150 | 90 | 0.00 | −74.274 | −77.7345 | 77.7345 | 0.00 |
| Example 4-55 | 175 | 90 | 0.00 | −133.742 | −62.0819 | 133.742 | 0.00 |
| Example 4-56 | 200 | 90 | 0.00 | −87.9446 | −50.7764 | 87.9446 | 0.00 |
| Example 4-57 | 25 | 105 | 0.50 | −24.9615 | −2.0642 | 24.9615 | 4.49 |
| Example 4-58 | 50 | 105 | 0.50 | −53.6922 | −7.2385 | 53.6922 | 4.18 |
| Example 4-59 | 75 | 105 | 0.50 | −81.738 | −9.26416 | 81.738 | 4.12 |
| Example 4-60 | 100 | 105 | 0.50 | −129.965 | 0.163201 | 129.965 | 3.45 |
| Example 4-61 | 125 | 105 | 0.50 | −191.557 | 5.12119 | 191.557 | 2.93 |
| Example 4-62 | 150 | 105 | 0.50 | −229.336 | −11.7384 | 229.336 | 2.93 |
| Example 4-63 | 175 | 105 | 0.50 | −239.939 | 22.9567 | 239.939 | 3.27 |
| Example 4-64 | 200 | 105 | 0.50 | −241.141 | 52.4878 | 241.141 | 3.72 |
| Example 4-65 | 25 | 120 | 0.87 | −30.2692 | −0.84840 | 30.2692 | 6.42 |
| Example 4-66 | 50 | 120 | 0.87 | −76.1418 | −0.62602 | 76.1418 | 5.10 |
| Example 4-67 | 75 | 120 | 0.87 | −128.125 | 3.04504 | 128.125 | 4.55 |
| Example 4-68 | 100 | 120 | 0.87 | −163.733 | 16.9155 | 163.733 | 4.74 |
| Example 4-69 | 125 | 120 | 0.87 | −244.645 | 36.2708 | 244.645 | 3.97 |
| Example 4-70 | 150 | 120 | 0.87 | −328.532 | 47.1086 | 328.532 | 3.55 |
| Example 4-71 | 175 | 120 | 0.87 | −336.89 | 100.448 | 336.89 | 4.04 |
| Example 4-72 | 200 | 120 | 0.87 | −346.413 | 119.458 | 346.413 | 4.48 |
| Example 4-73 | 25 | 135 | 1.00 | −30.1818 | −0.43374 | 30.1818 | 7.43 |
| Example 4-74 | 50 | 135 | 1.00 | −77.7811 | 0.402123 | 77.7811 | 5.77 |

TABLE 4-continued

| | Concentration (B) [μg/mL] | θ [°] | τ relative ratio (C) (\|sin2θ\|) [θ = degree] | CD spectrum [mdeg] About @450 nm | CD spectrum [mdeg] About @700 nm | Pmax | (A*B*C)/Pmax (A = 204.6/22.8) |
|---|---|---|---|---|---|---|---|
| Example 4-75 | 75 | 135 | 1.00 | −138.074 | 6.51752 | 138.074 | 4.87 |
| Example 4-76 | 100 | 135 | 1.00 | −208.923 | 25.7691 | 208.923 | 4.29 |
| Example 4-77 | 125 | 135 | 1.00 | −276.945 | 39.2789 | 276.945 | 4.05 |
| Example 4-78 | 150 | 135 | 1.00 | −331.597 | 56.2207 | 331.597 | 4.06 |
| Example 4-79 | 175 | 135 | 1.00 | −351.074 | 127.933 | 351.074 | 4.47 |
| Example 4-80 | 200 | 135 | 1.00 | −466.984 | 168.866 | 466.984 | 3.84 |
| Example 4-81 | 25 | 150 | 0.87 | −28.4136 | −2.24077 | 28.4136 | 6.83 |
| Example 4-82 | 50 | 150 | 0.87 | −76.1401 | −0.08146 | 76.1401 | 5.10 |
| Example 4-83 | 75 | 150 | 0.87 | −117.67 | 2.83803 | 117.67 | 4.95 |
| Example 4-84 | 100 | 150 | 0.87 | −179.737 | 12.7147 | 179.737 | 4.32 |
| Example 4-85 | 125 | 150 | 0.87 | −233.904 | 31.5423 | 233.904 | 4.15 |
| Example 4-86 | 150 | 150 | 0.87 | −311.735 | 39.6801 | 311.735 | 3.74 |
| Example 4-87 | 175 | 150 | 0.87 | −323.65 | 94.0516 | 323.65 | 4.20 |
| Example 4-88 | 200 | 150 | 0.87 | −326.197 | 120.249 | 326.197 | 4.76 |
| Example 4-89 | 25 | 165 | 0.50 | −25.1369 | −5.97778 | 25.1369 | 4.46 |
| Example 4-90 | 50 | 165 | 0.50 | −54.1712 | −8.91204 | 54.1712 | 4.14 |
| Example 4-91 | 75 | 165 | 0.50 | −85.2771 | −16.5045 | 85.2771 | 3.94 |
| Example 4-92 | 100 | 165 | 0.50 | −112.405 | −7.10573 | 112.405 | 3.99 |
| Example 4-93 | 125 | 165 | 0.50 | −172.165 | −9.25674 | 172.165 | 3.26 |
| Example 4-94 | 150 | 165 | 0.50 | −204.38 | −15.8375 | 204.38 | 3.29 |
| Example 4-95 | 175 | 165 | 0.50 | −226.903 | 14.977 | 226.903 | 3.46 |
| Example 4-96 | 200 | 165 | 0.50 | −262.556 | 26.2862 | 262.556 | 3.42 |
| Maximum value of (A*B*C)/Pmax | | | | | | | 16.98 |
| Minimum value of (A*B*C)/Pmax | | | | | | | 0.00 |
| For C > 0, minimum value of (A*B*C)/Pmax | | | | | | | 2.93 |

MEASUREMENT EXAMPLE

Measurement Example 1: Circular Dichroism Spectroscopy (CD)

For each of the chiral nano-structures manufactured in Examples 1 to 4, the spectra were obtained under the conditions in which the scan rate of 500 nm/min, the data interval of 0.5 nm, and the wavelength range of 200 nm to 900 nm using the circular dichroism spectrometer (JASCO, J-1500).

The spectra of the chiral nano-structures of Examples 1 to 4 are as shown in FIGS. 9 to 12, respectively. Referring to FIGS. 9 to 12, it can be confirmed that the chiral nano-structures of Examples 1 to 4 each exhibit two peaks on the CD spectrum. These two peaks are derived from the core and the shell of the nanoparticles, respectively. The shape and concentration of the nanoparticles, the components of the core and the shell, the rotation angle of the magnetic substance for giving chirality, etc. can all affect the form of the spectrum comprehensively. The wavelength range and peak value of each peak are described in Tables 1 to 4.

Measurement Example 2: Chirality of the Magnetic Field (τ)

In Examples 1 to 4, the relative ratio of the sizes (°) of the rotation angles (θ) of the two magnets and the chirality (τ) of the spiral magnetic field generated by the rotation of the two magnets was calculated through sin(2θ) and described in Tables 1 to 4, respectively.

Measurement Example 3

In the spectrum of Measurement Example 1, the absolute value (Pmax) of the peak value of the peak having the maximum size among the two peaks was described in Tables 1 to 4, and the value of (A*B*C)/Pmax of Equation 1 was obtained using the above and described in Tables 1 to 4.

Referring to Measurement Examples 1 to 3, it could be confirmed that in the chiral nano-structures of Examples 1 to 4, the value of (A*B*C)/Pmax in Equation 1 satisfied 0 to 20, so that it could be confirmed that the chirality corresponding to each spiral magnetic field generated according to the rotation angle of the magnetic substance was immediately and quickly exhibited.

More specifically, it could be confirmed that in the chiral nano-structures of Examples 1 and 2, the nanoparticles thereof included the spherical core-shell particles, and in the core-shell particles, the shell had the structure of substantially surrounding the surface of the core, and the value of (A*B*C)/Pmax in Equation 1 satisfied about 0.01 to about 1.0.

In addition, it could be confirmed that in the chiral nano-structure of Example 3, the nanoparticles included the rod-shaped core-shell particles, and the value of (A*B*C)/Pmax in Equation 1 satisfied about 0.3 to about 3.0.

In addition, it could be confirmed that in the chiral nano-structure of Example 4, the nanoparticles included the spherical core-shell particles, and in the core-shell particles, the shell had the structure of partially surrounding the surface of the core, and the value of (A*B*C)/Pmax in Equation 1 satisfied about 0.01 to about 20.

As described above, it could be confirmed that the chiral nano-structure manufactured according to the method of manufacturing the chiral nano-structure had the chirality derived by the structural feature of the nanoparticle arrangement structure aligned in the predetermined arrangement by receiving the chirality of the magnetic field formed by the magnetic forming operation and the magnetic field adjusting operation, and the chirality was given and modulated by the relatively simple technical means of applying the magnetic field in real time. The provision of the structural chirality and the real-time self-assembly property by the method of manufacturing the chiral nano-structure can have the advantage of securing the wide applicability in a technical field to which it can be applied.

INDUSTRIAL APPLICABILITY

According to the method and apparatus for manufacturing chiral nano-structure according to the present disclosure, it is possible to easily mass-produce the chiral nano-structure that can be used in various fields through the simpler process.

The invention claimed is:

1. A method of manufacturing a chiral nano-structure, the method comprising:
a magnetic field forming operation that forms a magnetic field;
a particle arranging operation that arranges at least two nanoparticles in the magnetic field; and
a magnetic field adjusting operation to form a nanostructure, wherein the magnetic field adjusting operation adjusts at least one of a magnetic flux density, a magnetization direction, and a spatial range of the magnetic field,
wherein,
in the magnetic field adjusting operation, the arrangement of the nanoparticles arranged in the magnetic field is aligned to correspond to a structure of the magnetic field,
the nanostructure has chirality, and
the at least two nanoparticles comprise magnetoplasmonic particles.

2. The method of claim 1,
wherein in the magnetic field forming operation, the magnetic field is a spiral magnetic field.
3. The method of claim 1,
wherein in the magnetic field forming operation, the magnetic field is a spiral magnetic field formed by relatively rotating at least two magnetic substances.
4. The method of claim 1,
wherein the magnetoplasmonic particles comprise core-shell particles having a core;
and a shell surrounding at least a part of the surface of the core and including a component different from that of the core.
5. The method of claim 4,
wherein in the core-shell particle, any one of the core and the shell comprises a magnetic component and the other comprises a metal component.
6. The method of claim 5,
wherein the metal component comprises one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.
7. The method of claim 5,
wherein the magnetic component comprises one selected from the group consisting of iron oxide ($Fe_3O_4$), nickel oxide (NiO), cobalt oxide ($CO_3O_4$), iron (Fe), nickel (Ni), cobalt (Co), and combinations thereof.
8. The method of claim 1,
wherein in the particle arrangement operation, the nanoparticles are arranged in a state of being dispersed in a solvent or a dispersion medium.
9. The method of claim 8,
wherein the solvent or the dispersion medium comprises one selected from the group consisting of distilled water, deionized water, alcohol, organic solvent, polymer, and combinations thereof.
10. The method of claim 1,
wherein in the magnetic field forming operation, the magnetic field is a spiral magnetic field formed by relatively rotating at least two magnetic substances, and
in the magnetic field adjusting operation, the magnetization direction is adjusted by changing at least one of an angle at which the at least two magnetic substances are relatively rotated and the degree at which the at least two magnetic substances are parallel to each other.
11. The method of claim 1,
wherein in the magnetic field forming operation, the magnetic field is a spiral magnetic field formed by relatively rotating at least two magnetic substances, and
in the magnetic field adjusting operation, the spatial range of the magnetic field is adjusted by changing a straight distance between the at least two magnetic substances.
12. The method of claim 1,
wherein in the magnetic field forming operation, the magnetic field is a spiral magnetic field formed by relatively rotating at least two magnetic substances, and
in the magnetic field adjusting operation, the magnetic flux density of the magnetic field is adjusted by changing at least one of magnetic forces of the at least two magnetic substances and a straight distance between the at least two magnetic substances.

* * * * *